United States Patent
Ferrara et al.

(10) Patent No.: US 11,910,623 B2
(45) Date of Patent: Feb. 20, 2024

(54) PHOTOELECTRIC CONVERSION ELEMENT AND MANUFACTURING METHOD THEREOF

(71) Applicant: SUMITOMO CHEMICAL COMPANY, LIMITED, Tokyo (JP)

(72) Inventors: Giovanni Ferrara, Ibaraki (JP); Miki Nishi, Ibaraki (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 367 days.

(21) Appl. No.: 17/274,414

(22) PCT Filed: Sep. 26, 2019

(86) PCT No.: PCT/JP2019/037781
§ 371 (c)(1),
(2) Date: Mar. 8, 2021

(87) PCT Pub. No.: WO2020/071223
PCT Pub. Date: Apr. 9, 2020

(65) Prior Publication Data
US 2021/0257571 A1    Aug. 19, 2021

(30) Foreign Application Priority Data
Oct. 1, 2018 (JP) .................... 2018-186938

(51) Int. Cl.
*H01L 51/42* (2006.01)
*H10K 30/15* (2023.01)
(Continued)

(52) U.S. Cl.
CPC .......... *H10K 30/152* (2023.02); *H10K 30/81* (2023.02); *H10K 85/211* (2023.02); *G06F 21/32* (2013.01); *G06V 40/1318* (2022.01)

(58) Field of Classification Search
CPC .... H10K 30/152; H10K 30/81; H10K 85/211; H10K 30/30; H10K 85/113;
(Continued)

(56) References Cited

U.S. PATENT DOCUMENTS
2018/0231376 A1 * 8/2018 Send .................... H10K 30/353

FOREIGN PATENT DOCUMENTS
JP   2018-46219 A   3/2018
JP   2018046219 A * 3/2018
(Continued)

OTHER PUBLICATIONS
Electrosprayed Polymer-Hybridized Multidoped ZnO Mesoscopic Nanocrystals Yield Highly Efficient and Stable Perovskite Solar Cells,,ACS Omega, Aug. 21, 2018, vol. 3, pp. 9648-9657 (Year: 2018).*

(Continued)

*Primary Examiner* — Ermias T Woldegeorgis
(74) *Attorney, Agent, or Firm* — Foley & Lardner LLP

(57) ABSTRACT

To reduce the dark current ratio.
A photoelectric conversion element 10 including an anode 16, a cathode 12, an active layer 14 provided between the anode and the cathode, and at least one electron transportation layer 13 provided between the active layer and the cathode, in which
the electron transportation layer contains an insulating material and a semiconductor material;
a difference between a work function of the electron transportation layer and a work function of the cathode is 0.88 eV or more;
the active layer contains a p-type semiconductor material and an n-type semiconductor material; and
a work function of the electron transportation layer (Wf1) and an energy level of a lowest occupied molecular
(Continued)

orbital of the n-type semiconductor material (LUMO) satisfy the following Formula (2):

$$|LUMO|-Wf1 \geq 0.06 \text{ eV} \qquad (2).$$

19 Claims, 2 Drawing Sheets

(51) Int. Cl.
  *H10K 30/81* (2023.01)
  *H10K 85/20* (2023.01)
  *G06F 21/32* (2013.01)
  *G06V 40/13* (2022.01)

(58) Field of Classification Search
  CPC ...... H10K 85/215; H10K 39/32; G06F 21/32; G06V 40/1318; Y02E 10/549; Y02P 70/50; H01L 27/146
  See application file for complete search history.

(56) References Cited

FOREIGN PATENT DOCUMENTS

| | | |
|---|---|---|
| JP | 2018-526636 A | 9/2018 |
| WO | WO 2016/093003 A1 | 6/2016 |

OTHER PUBLICATIONS

Chen, Hsiu-Cheng et al.,"Solution-Processed Zinc Oxide/Polyethylenimine Nanocomposites as Tunable Electron Transport Layers for Highly Efficient Bulk Heterojunction Polymer Solar Cells," ACS Applied Materials & Interfaces, 2015, vol. 7, pp. 6273-6281.

Office Action issued in corresponding Japanese Patent Application No. 2018-186938, dated Aug. 30, 2022.

Japanese Office Action dated Apr. 5, 2022 issued in corresponding Japanese Application No. JP2018-186938.

Mahmood, Khalid et al.,"Electrosprayed Polymer-Hybridized Multidoped ZnO Mesoscopic Nanocrystals Yield Highly Efficient and Stable Perovskite Solar Cells",,ACS Omega, Aug. 21, 2018, vol. 3, pp. 9648-9657.

Na Wu et al.,"Zinc oxide: Conjugated polymer nanocomposite as cathode buffer layer for solution processed inverted organic solar cells" Solar Energy Materials & Solar Cells, 2015, vol. 141, pp. 248-259.

\* cited by examiner

PHOTOELECTRIC CONVERSION ELEMENT AND MANUFACTURING METHOD THEREOF

CROSS-REFERENCE TO RELATED APPLICATIONS

The present application claims priority under 37 U.S.C. § 371 to International Patent Application No. PCT/JP2019/037781, filed Sep. 26, 2019, which claims priority to and the benefit of Japanese Patent Application No. 2018-186938, filed on Oct. 1, 2018. The contents of these applications are hereby incorporated by reference in their entireties.

TECHNICAL FIELD

The present invention relates to a photoelectric conversion element and a method for producing the same.

BACKGROUND ART

Photoelectric conversion elements are an extremely useful device in view of, for example, energy saving and reduction in discharge amount of carbon dioxide, and therefore have attracted attention.

The photoelectric conversion element is an element including at least a pair of electrodes composed of an anode and a cathode, and an active layer provided between the pair of electrodes. In the photoelectric conversion element, one electrode is made of a transparent or translucent material. Light is incident on the active layer from the transparent or translucent electrode side. The energy (hv) of light incident on the active layer generates charges (holes and electrons) in the active layer. The generated holes move toward the anode and the electrons move toward the cathode.

Then, charges which have reached the anode and the cathode are extracted outside the element.

The photoelectric conversion element is used for a photodetection element, for example. The photoelectric conversion element used as the photodetection element is used in a state in which a voltage is applied. Light incident on the element is converted into current and detected as current. However, even in a state in which light is not incident, a minute amount of current flows through the photoelectric conversion element. This current is known as dark current, and is a factor of decreasing the accuracy of light detection. The dark current generally varies depending on a voltage applied to the photoelectric conversion element.

The voltage applied to the photoelectric conversion element varies depending on the type of device on which the element is to be mounted. Thus, the dark current varies depending on a device on which the element is to be mounted. It is preferable that the dark current does not vary depending on the device on which the element is to be mounted from the viewpoint of versatility.

A configuration has been known in which a single layer of an electron transportation layer containing zinc oxide and PFN (poly[(9,9-bis(3'-(N,N-dimethylamino)propyl-2,7-fluorene)-alt-2,7-(9,9-dioctyl)fluorene]) or PEI (polyethyleneimine) is used for improving characteristics such as photoelectric conversion efficiency in the photoelectric conversion element (see, Non-Patent Documents 1 and 2).

PRIOR ART DOCUMENTS

Non-Patent Documents

Non-Patent Document 1: Solar Energy Materials & Solar Cells, vol. 141 (2015) pp. 248 to 259

Non-Patent Document 2: Organic Electronics, vol. 38 (2016) pp. 150 to 157

SUMMARY OF THE INVENTION

Problems to be Solved by the Invention

However, the photoelectric conversion elements disclosed in the above Non-Patent Documents 1 and 2 do not achieve sufficient reduction in variation of the dark current due to variation of the voltage applied to the photoelectric conversion element.

Means for Solving the Problems

The inventors of the present invention conducted diligent research in order to solve the above problems, found that variation of the dark current due to the voltage applied to the photoelectric conversion element can be reduced when the work function of the electron transportation layer and the work function of the cathode satisfies a predetermined relationship, and thus completed the present invention.

That is, the present invention provides the following [1] to [20].

[1] A photoelectric conversion element including
an anode, a cathode, an active layer provided between the anode and the cathode, and at least one electron transportation layer provided between the active layer and the cathode, in which
one layer of the at least one electron transportation layer contains an insulating material and a semiconductor material; and
a work function of the one layer (Wf1) and a work function of the cathode (Wf2) satisfy the following Formula (1):

$$Wf2 - Wf1 \geq 0.88 \text{ eV} \tag{1}$$

[2] The photoelectric conversion element according to [1], in which the active layer contains a p-type semiconductor material and an n-type semiconductor material; and the work function of the electron transportation layer (Wf1) and an energy level of a lowest occupied molecular orbital of the n-type semiconductor material (LUMO) satisfy the following Formula (2):

$$|LUMO| - Wf1 \geq 0.06 \text{ eV} \tag{2}$$

[3] The photoelectric conversion element according to [1] or [2], in which the n-type semiconductor material is a fullerene derivative.

[4] The photoelectric conversion element according to [3], in which the fullerene derivative is C60PCBM.

[5] The photoelectric conversion element according to any one of [1] to [4], in which
a work function of the insulating material (Wf3), the work function of the electron transportation layer (Wf1), and a work function of the semiconductor material (Wf4) satisfy the following Formulae (3) and (4):

$$Wf3 > Wf1 \tag{3}$$

$$Wf3 < Wf4 \tag{4}$$

[6] The photoelectric conversion element according to any one of [1] to [5], in which the semiconductor material is one or more oxide semiconductor material selected from the group consisting of ZnO, AZO, and GZO.

[7] The photoelectric conversion element according to any one of [1] to [6], in which the insulating material is a polymer having an amino group or an alkoxy group.

[8] The photoelectric conversion element according to [7], in which the insulating material is ethoxylated polyethyleneimine.

[9] The photoelectric conversion element according to any one of [1] to [8], in which the electron transportation layer is a layer cured by subjecting a coating film containing the insulating material, the semiconductor material, and a solvent having a boiling point of 68° C. or more to dry treatment.

[10] The photoelectric conversion element according to [9], in which the solvent includes an alcohol solvent having a pKa of 15.5 or more.

[11] The photoelectric conversion element according to [10], in which the alcohol solvent includes one or more alcohol solvent selected from the group consisting of ethanol, 2-propanol, and 3-pentanol.

[12] The photoelectric conversion element according to any one of [1] to [11], in which the photoelectric conversion element is a photodetection element.

[13] An image sensor including the photoelectric conversion element according to [12].

[14] A fingerprint authentication device including the photoelectric conversion element according to [12].

[15] A method for producing the photoelectric conversion element according to [1], the method including a step of applying a coating liquid containing the insulating material, the semiconductor material, and a solvent having a boiling point of 68° C. or more to form a coating film and subjecting the coating film to dry treatment to cure the coating film, thus forming the electron transportation layer.

[16] The method for producing a photoelectric conversion element according to [15], in which the semiconductor material is one or more oxide semiconductor material selected from the group consisting of ZnO, AZO, and GZO.

[17] The method for producing a photoelectric conversion element according to [15] or [16], in which the insulating material is a polymer having an amino group or an alkoxy group.

[18] The method for producing a photoelectric conversion element according to [17], in which the insulating material is ethoxylated polyethyleneimine.

[19] The method for producing a photoelectric conversion element according to any one of [15] to [18], in which the solvent includes an alcohol solvent having a pKa of 15.5 or more.

[20] The method for producing a photoelectric conversion element according to [19], in which the alcohol solvent includes one or more alcohol solvent selected from the group consisting of ethanol, 2-propanol, and 3-pentanol.

Effect of the Invention

According to a photoelectric conversion element of the present invention, variation of dark current due to variation of a voltage applied to the photoelectric conversion element can be reduced.

MODE FOR CARRYING OUT THE INVENTION

Figure 1:
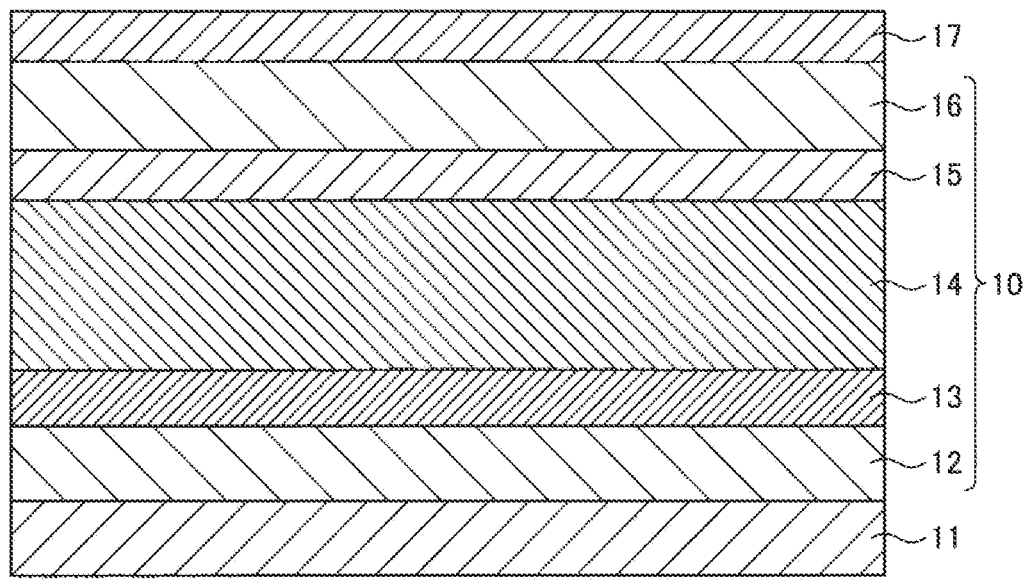
FIG. 1 is a schematic view illustrating a configuration example of a photoelectric conversion element.

Hereinafter, a photoelectric conversion element according to an embodiment of the present invention will be described with reference to drawings. Note that the drawings merely schematically show the shape, size, and arrangement of each component to the extent that the invention can be understood. The present invention is not limited to the descriptions below, and various changes and modifications can be appropriately made on each of the components without departing from the spirit and scope of the present invention. Further, the configurations according to an embodiment of the present invention are not necessarily produced or used in the arrangements illustrated in the drawings.

1. Photoelectric Conversion Element

The photoelectric conversion element of the present embodiment includes an anode, a cathode, an active layer provided between the anode and the cathode, and at least one electron transportation layer provided between the active layer and the cathode, in which one layer of the at least one electron transportation layer contains an insulating material and a semiconductor material; and a work function of the one layer (Wf1) and a work function of the cathode (Wf2) satisfy the following formula.

$$Wf2-Wf1 \geq 0.88 \text{ eV}$$

Here, possible configuration examples of the photoelectric conversion element of the present embodiment will be described.

FIG. 1 is a schematic view illustrating a configuration example of a photoelectric conversion element of the present embodiment.

As illustrated in FIG. 1, a photoelectric conversion element 10 of the present embodiment is provided on a supporting substrate 11, for example. The photoelectric conversion element 10 includes a cathode 12 provided in contact with the supporting substrate 11, an electron transportation layer 13 provided in contact with the cathode 12, an active layer 14 provided in contact with the electron transportation layer 13, a hole transportation layer 15 provided in contact with the active layer 14, and an anode 16 provided in contact with the hole transportation layer 15.

This configuration example further includes a sealing substrate 17 provided in contact with the anode 16.

Hereinafter, the parameters, components, and production method according to the photoelectric conversion element of the present embodiment will be described in more detail.

(Substrate)

A photoelectric conversion element is typically formed on a substrate. Electrodes including a cathode and an anode are typically formed on the substrate. The material of the substrate is not particularly limited particularly as long as the material does not chemically change in the formation of a layer containing an organic compound. Examples of the material of the substrate include glass, plastic, a polymer film, and silicon. In a case where the substrate is opaque, an electrode opposite to an electrode provided on the opaque substrate side (that is, an electrode provided far from the substrate) is preferably a transparent or translucent electrode. Also, as the substrate, a substrate may be used in which a later-described electrode (cathode or anode) or a layer structure in which an electrode can be formed through additional steps such a patterning step has been formed.
(Electrode)

Examples of the material of the transparent or translucent electrode include a conductive metal oxide film, and a translucent metal thin film. Specific examples thereof include conductive materials such as indium oxide, zinc oxide, tin oxide, and indium tin oxide (ITO), indium zinc oxide (IZO), and NESA which are composites thereof, gold, platinum, silver, and copper. As the material of the transparent or translucent electrode, ITO, IZO, and zinc oxide are preferable. Also, a transparent conductive film formed by using, as a material, an organic compound such as polyaniline and a derivative thereof, and polythiophene and a derivative thereof may be used as the electrode. The transparent or translucent electrode may be an anode or a cathode.

If one electrode is transparent or translucent, the other electrode may be an electrode with low light transmittance. Examples of the material of the electrode with low light transmittance include a metal, and a conductive polymer. Specific examples of the material of the electrode with low light transmittance include metals such as lithium, sodium, potassium, rubidium, cesium, magnesium, calcium, strontium, barium, aluminum, scandium, vanadium, zinc, yttrium, indium, cerium, samarium, europium, terbium, and ytterbium; and alloys of two or more types of these metals, or alloys of one or more types of these metals and one or more types of metal selected from the group consisting of gold, silver, platinum, copper, manganese, titanium, cobalt, nickel, tungsten, and tin; graphite; graphite intercalation compounds; polyaniline and derivatives thereof; and polythiophene and derivatives thereof. Examples of the alloy include a magnesium-silver alloy, a magnesium-indium alloy, a magnesium-aluminum alloy, an indium-silver alloy, a lithium-aluminum alloy, a lithium-magnesium alloy, a lithium-indium alloy, and a calcium-aluminum alloy.

In the photoelectric conversion element of the present embodiment, the work function of the electron transportation layer (Wf1) and the work function of the cathode (Wf2) satisfy the following Formula (1).

$$Wf2-Wf1 \geq 0.88 \text{ eV} \tag{1}$$

The material of the cathode can be selected considering the work function of the cathode and the work function of the electron transportation layer.

Examples of the cathode material according to the present embodiment include ITO (work function: 5.1 eV), Au (work function: 5.2 eV), and Ag (work function: 4.9 eV).

As the cathode material, ITO is preferable from the viewpoint of light transmittance.

The work function of the electron transportation layer (Wf1) and the work function of the cathode (Wf2) preferably satisfy the following Formula (1-1), more preferably satisfy the following Formula (1-2), and even more preferably satisfy the following Formula (1-3), from the viewpoint that such work functions reduce variation of dark current due to variation of the voltage applied to the photoelectric conversion element.

$$Wf2-Wf1 \geq 0.90 \text{ eV} \tag{1-1}$$

$$Wf2-Wf1 \geq 0.93 \text{ eV} \tag{1-2}$$

$$Wf2-Wf1 \geq 0.95 \text{ eV} \tag{1-3}$$

Further, the work function of the electron transportation layer (Wf1) and the work function of the cathode (Wf2) preferably satisfy the following Formula (1-4), and more preferably satisfy the following Formula (1-5).

$$Wf2-Wf1 \leq 10 \text{ eV} \tag{1-4}$$

$$Wf2-Wf1 \leq 5 \text{ eV} \tag{1-5}$$

The work function of the cathode may be measured by using, for example, a Kelvin probe apparatus (for example, FAC-2, manufactured by Riken Keiki Co., Ltd.).

As a method for forming the electrode, any preferred publicly known formation method may be employed. Examples of the method for forming the electrode include a vacuum deposition method, a sputtering method, an ion plating method, and a plating method. The method for forming the electrode may include additional steps such as a step of patterning a layer formed by the above-described method, and a step of performing surface treatment.
(Intermediate Layer)

As illustrated in FIG. 1, the photoelectric conversion element may include, as an additional component for improvement of photoelectric conversion efficiency and improvement of characteristics such as reduction in dark current, an additional intermediate layer such as a charge transportation layer (electron transportation layer, hole transportation layer, electron injection layer, and hole injection layer).

As a material used for such an intermediate layer, any preferred publicly known material can be used. Examples of the material of the intermediate layer include halides of alkaline metals such as lithium fluoride or alkaline earth metals, and oxides of these metals.

Further, examples of the material used for the intermediate layer include fine particles of inorganic semiconductor materials such as titanium oxide and a mixture of PEDOT (poly(3,4-ethylenedioxythiophene)) and PSS (poly(4-styrenesulfonate)) (PEDOT: PSS).

As illustrated in FIG. 1, the photoelectric conversion element may include a hole transportation layer between the anode and the active layer. The hole transportation layer has a function of transporting holes from the active layer to the electrode.

The hole transportation layer may be a single layer or may be composed of two or more laminated layers. A hole transportation layer provided in contact with the anode may be particularly referred to as a hole injection layer. The hole transportation layer (hole injection layer) provided in contact with the anode has a function of promoting injection of holes into the anode. The hole transportation layer (hole injection layer) may be in contact with the active layer.

The hole transportation layer contains a hole transporting material. Examples of the hole transporting material include polythiophene and derivatives thereof, aromatic amine compounds, polymer compounds containing a constitutional unit having an aromatic amine residue, CuSCN, CuI, NiO, and molybdenum oxide ($MoO_3$).

The photoelectric conversion element of the present embodiment may include an electron transportation layer between the cathode and the active layer. The electron transportation layer has a function of transporting electrons from the active layer to the cathode. The electron transportation layer may be in contact with the cathode. The electron transportation layer may be in contact with the active layer. The electron transportation layer may be a single layer or may be composed of two or more laminated layers. In a case where the electron transportation layer is composed of two or more layers, at least one electron transportation layer is only required to be a layer that satisfies the requirements described above. Note that an electron transportation layer provided in contact with the cathode may be particularly referred to as an electron injection layer.

The electron transportation layer of the present embodiment contains an insulating material and a semiconductor material. Hereinafter, a specific description will be given.

(1) Insulating Material

The work function of the insulating material (Wf3), the work function of the electron transportation layer (Wf1), and the work function of the semiconductor material of the present embodiment (Wf4) may satisfy the following Formulae (3) and (4).

$$Wf3 > Wf1 \quad (3)$$

$$Wf3 < Wf4 \quad (4)$$

The insulating material and semiconductor material that can be contained in the electron transportation layer can be selected to satisfy such requirements.

Examples of the insulating material that can be contained in the electron transportation layer of the present embodiment include compounds having an alkylene structure, polyvinylpyrrolidone (PVP), polymethyl methacrylate resin (PMMA), and poly(4-vinylphenol) (P-4VP).

The insulating material is preferably a polymer having an amino group or an alkoxy group.

Examples of the compound having an alkylene structure include polyalkylene imine and derivatives thereof. Examples of the polyalkylene imine and derivatives thereof include alkylene imines having from 2 to 8 carbon atoms such as ethyleneimine, propyleneimine, butyleneimine, dimethylethyleneimine, pentyleneimine, hexyleneimine, heptyleneimine, and octyleneimine, particularly, polymers obtained by polymerizing one or two or more types of alkylene imines having from 2 to 4 carbon atoms by a common method, and chemically modified polymers formed by reacting these polymers with various compounds.

As the polyalkylene imine and derivatives thereof, ethoxylated polyethyleneimine (PEIE, work function: 4.1 eV), which contains polyethyleneimine (PEI) and polyalkylene imine as the main chain, and is a modified product in which ethylene oxide is added to nitrogen atoms in the main chain, is preferably used because the work function of the electron transportation layer is effectively increased.

(2) Semiconductor Material

Examples of the semiconductor material that can be contained in the electron transportation layer of the present embodiment include metal compounds and semimetals.

Examples of the metal compound include metal oxides, metal hydroxides, and metal alkoxides. The metal oxide preferably contains a di- or higher-valent metal, and more preferably contains zinc or titanium.

Examples of the metal oxide include zinc oxide (ZnO, work function: 4.5 eV), aluminum-doped zinc oxide (AZO), gallium-doped zinc oxide (GZO), titanium oxide, and niobium oxide. A metal oxide containing zinc is preferable, and from the viewpoint of ease in availability and processability, one or more oxide semiconductor material selected from the group consisting of ZnO, AZO, and GZO is more preferable.

Examples of the metal hydroxide include zinc hydroxide, titanium hydroxide, and niobium hydroxide. The metal hydroxide is preferably a metal hydroxide containing zinc or titanium, and in particular, titanium hydroxide is preferable.

Examples of the metal alkoxide include metal methoxide, metal ethoxide, metal propoxide, metal isopropoxide, metal n-butoxide, metal sec-butoxide, metal isobutoxide, and metal tert-butoxide. A metal alkoxide containing titanium is preferable, and in particular, titanium (IV) isopropoxide is preferable.

Examples of the semimetal include Si, Ge, As, Sb, and Te.

The semiconductor material that can be contained in the electron transportation layer of the present embodiment is preferably nanoparticles having a particle size of 0.1 nm to 100 nm, for example, from the viewpoint of improving characteristics of the photoelectric conversion element and achieving even more easy production.

The weight ratio of the insulating material and the semiconductor material contained in the electron transportation layer is typically insulating material semiconductor material=1:10 to 1:5000, and preferably insulating material: semiconductor material=1:50 to 1:2500.

The intermediate layer is preferably formed by an application method such as a slit coating method, a knife coating method, a spin coating method, a micro gravure coating method, a gravure coating method, a bar coating method, and an inkjet printing method.

(Active Layer)

The photoelectric conversion element of the present embodiment is an organic photoelectric conversion element having at least one active layer containing an organic material. The active layer contains an organic material, and the organic material contains a polymer compound.

The active layer of the present embodiment preferably has a bulk heterojunction structure containing a p-type semiconductor material (electron-donating compound) and an n-type semiconductor material (electron-accepting compound).

In the present embodiment, the work function of the electron transportation layer (Wf1) which has been described and the energy level of the LUMO of the n-type semiconductor material contained in the active layer (LUMO) preferably satisfy the following Formula (2-1), more preferably satisfy the following Formula (2-2), and even more preferably satisfy the following Formula (2-3).

Here, "|LUMO|" refers to the absolute value of the LUMO.

$$|LUMO| - Wf1 \geq 0.1 \quad (2\text{-}1)$$

$$|LUMO| - Wf1 \geq 0.2 \quad (2\text{-}2)$$

$$|LUMO| - Wf1 \geq 0.25 \quad (2\text{-}3)$$

Further, the work function of the electron transportation layer (Wf1) and the energy level of the LUMO of the n-type semiconductor material contained in the active layer (LUMO) preferably satisfy the following Formula (2-4), and more preferably satisfy the following Formula (2-5).

$$|LUMO| - Wf1 \leq 1.0 \quad (2\text{-}4)$$

$$|LUMO| - Wf1 \leq 0.5 \quad (2\text{-}5)$$

Although details of a preferred p-type semiconductor material and n-type semiconductor material will be described, whether it is the p-type semiconductor material or the n-type semiconductor material can be relatively determined from the energy level of the HOMO or LUMO of the selected p-type semiconductor material and the n-type semiconductor material.

Measurement of the energy level of the HOMO and LUMO of the semiconductor material (p-type semiconductor material and n-type semiconductor material) of the present embodiment can be performed in accordance with a publicly known method based on literatures and the like by using a publicly known measurement apparatus. Specifically, measurement can be performed by using a cyclic voltammetry measurement apparatus (for example, Electrochemical Analyzer Model 600B, manufactured by BAS Inc.).

The thickness of the active layer is usually 1 nm to 100 µm. In particular, the thickness of the active layer of the photoelectric conversion element used as a photodetection element is preferably 500 nm to 1,000 nm.

According to the photoelectric conversion element of the present embodiment, a configuration which has been described can further reduce the dark current ratio.

The dark current ratio can be measured by using any preferred publicly known measurement apparatus. Examples of the measurement apparatus include a semiconductor parameter analyzer (B1500A, manufactured by Agilent Technologies).

The dark current ratio refers to the ratio of the dark current obtained when a higher voltage is applied to the photoelectric conversion element to the dark current obtained when a lower voltage is applied to the photoelectric conversion element (dark current (at high voltage application)/dark current (at low voltage application)).

2. Method for Producing Photoelectric Conversion Element

The method for producing the photoelectric conversion element of the present embodiment is not particularly limited. The photoelectric conversion element can be produced by a formation method suitable for the material selected in the formation of each component.

The method for producing a photoelectric conversion element of the present embodiment is a method for producing a photoelectric conversion element including an anode, a cathode, an active layer provided between the anode and the cathode, and at least one electron transportation layer provided between the active layer and the cathode, in which one layer of the at least one electron transportation layer contains an insulating material and a semiconductor material; the work function of the one layer (Wf1) and the work function of the cathode (Wf2) satisfy the following Formula (1), the method including a step of applying a coating liquid containing the insulating material, the semiconductor material, and a solvent having a boiling point of 68° C. or more to form a coating film and subjecting the coating film to dry treatment to cure the coating film, thus forming the electron transportation layer.

$$Wf2 - Wf1 \geq 0.88 \text{ eV} \quad (1)$$

(1) Step of Forming Electron Transportation Layer

The electron transportation layer of the present embodiment can be formed by an application method using a coating liquid for forming an electron transportation layer (hereinafter, may be referred to as ink). Note that other intermediate layers such as a hole transportation layer can be formed in the same manner.

Hereinafter, steps (i) and (ii) that can be included in the step of forming an electron transportation layer which is a main component of the photoelectric conversion element of the present embodiment will be described.

(Step (i))

The step (i) is a step of applying a coating liquid containing an insulating material, a semiconductor material, and a solvent having a boiling point of 68° C. or more to form a coating film.

An object to which the coating liquid for forming an electron transportation layer is applied varies depending on the layer structure of the photoelectric conversion element to be produced and the order of layer formation. For example, in a case where the photoelectric conversion element has a layer structure of substrate/anode/hole transportation layer/active layer/electron transportation layer/cathode, and also has an inverse laminate structure where a laminate is formed from the cathode side, an application target of the coating liquid for forming an electron transportation layer is the cathode, a substrate in which the cathode has been formed, or another electron transportation layer. Also, in a case where the photoelectric conversion element is a sequential laminate structure where a laminate is formed from the anode side, for example, an application target of the coating liquid for forming an electron transportation layer is the active layer or another electron transportation layer.

As a method for applying the coating liquid for forming an electron transportation layer to an object on which the electron transportation layer is formed, any preferred application method can be employed.

The application method is preferably a slit coating method, a knife coating method, a spin coating method, a micro gravure coating method, a gravure coating method, a bar coating method, an inkjet printing method, a nozzle coating method, or a capillary coating method; more preferably, a spin coating method, a capillary coating method, or a bar coating method; and even more preferably a spin coating method.

The coating liquid for forming an electron transportation layer may be a solution, a dispersion, or a dispersion such as an emulsion, and a suspension.

The coating liquid for forming an electron transportation layer may contain only one type of solvent, or may be a mixed solvent containing two or more types of solvents.

As the solvent having a boiling point of 68° C. or more which can be contained in the coating liquid for an electron transportation layer, for example, water, alcohol, ketone, and hydrocarbon are exemplified.

Specific examples of the alcohol include ethanol, 1-propanol, 2-propanol, 2-butanol, 2-pentanol, 3-pentanol, ethylene glycol, propylene glycol, butoxyethanol, and methoxyethanol.

Specific examples of the ketone include acetone, methyl ethyl ketone, methyl isobutyl ketone, 2-heptanone, and cyclohexanone.

Specific examples of the hydrocarbon include n-pentane, cyclohexane, n-hexane, benzene, toluene, xylene, tetralin, chlorobenzene, and ortho-dichlorobenzene.

As the solvent, an alcohol solvent having a pKa (−log Ka where Ka is an acid dissociation constant) of 15.5 or more is preferably contained from the viewpoint of further increasing the work function of the electron transportation layer.

Examples of such an alcohol solvent include alcohol solvents having 2 or more carbon atoms. More specifically, ethanol (boiling point: 78.4° C., pKa: 15.9), 2-propanol (boiling point: 82.6° C., pKa: 16.5), and 3-pentanol (boiling point: 116° C., pKa: 18.2) are exemplified. In other words, the coating liquid for forming an electron transportation layer preferably contains one or more alcohol solvent selected from the group consisting of ethanol, 2-propanol, and 3-pentanol. Use of such an alcohol solvent allows the work function of the electron transportation layer to be larger than the value estimated from the work functions of the selected insulating material and semiconductor material, for example, the work function of a conventional electron transportation layer having a two-layer structure of ZnO/PEIE.

Further, when the above solvent is used, the production of the photoelectric conversion element can be performed without using a toxic solvent such as methoxyethanol, which has been conventionally used as a solvent especially for PEIE. Moreover, the formation step can be performed regardless of the lamination order (sequential lamination or inverse lamination) even after formation of the active layer. As a result, the production of the photoelectric conversion element can be more simply and efficiently performed.

The amount of the solvent in the coating liquid for forming an electron transportation layer is preferably 1 weight or more and 10,000 weight or less, and more preferably 10 weight or more and 1,000 weight or less when the weight of the material other than the solvent, which can be contained in the electron transportation layer, is 1.

(Step (ii))

The step (ii) is a step of subjecting the coating film to dry treatment to cure the coating film, thus forming an electron transportation layer.

As a method for subjecting the coating film to dry treatment to cure the coating film, in other words, a method for removing the solvent from the coating film to cure the coating film, thus forming an electron transportation layer, any preferred method can be employed. Examples of the dry treatment include drying methods such as a method of directly heating using a hot plate, a hot-air drying method, an infrared-radiation heat drying method, a flash lamp annealing method, and a reduced-pressure drying method.

(2) Step of Forming Active Layer

The active layer of the present embodiment can be formed by an application method using a coating liquid for forming an active layer (ink) in the same manner as in the step of forming an electron transportation layer which has been described.

Thus, detailed descriptions of common terms and steps are omitted in some cases.

The active layer which is a main component of the photoelectric conversion element of the present embodiment preferably has a bulk heterojunction structure. Accordingly, an active layer having a bulk heterojunction structure can be formed by an application method using a coating liquid containing a p-type semiconductor material, an n-type semiconductor material, and a solvent.

In the method for producing a photoelectric conversion element of the present embodiment, the step of forming an active layer is a step of applying a coating liquid containing a p-type semiconductor material, an n-type semiconductor material, and a solvent to form a coating film and subjecting the coating film to dry treatment to cure the coating film, thus forming an active layer.

Hereinafter, steps (i) and (ii) that can be included in the step of forming an active layer of the photoelectric conversion element of the present embodiment will be described.

(Step (i))

The step (i) is a step of applying a coating liquid containing a p-type semiconductor material, an n-type semiconductor material, and a solvent to form a coating film.

As a method for applying the coating liquid for forming an active layer to an object on which the active layer is to be formed, any preferred application method which has been described can be employed.

An object to which the coating liquid for forming an active layer is applied varies depending on the layer structure of the photoelectric conversion element to be produced and the order of layer formation. For example, in a case where the photoelectric conversion element has a layer structure of substrate/anode/hole transportation layer/active layer/electron transportation layer/cathode, and also has an inverse laminate structure where a laminate is formed from the cathode side, an application target of the coating liquid for forming an active layer is the electron transportation layer. Also, in a case where the photoelectric conversion element is a sequential laminate structure where a laminate is formed from the anode side, for example, an application target of the coating liquid for forming an active layer is the hole transportation layer.

(Step (ii))

The step (ii) is a step of subjecting the coating film to dry treatment to cure the coating film, thus forming an active layer.

As a method for removing the solvent from the coating film, in other words, a method for removing the solvent from the coating film to form a solidified film, any preferred method which has been described can be employed.

The step of forming an active layer may include another step in addition to the above steps (i) and (ii) as long as the objects and effects of the present invention are not impaired.

The method for producing a photoelectric conversion element may also be a method for producing a photoelectric conversion element including a plurality of active layers. In this case, the steps (i) and (ii) may be repeated a plurality of times.

The coating liquid for forming an active layer that can be used may be a solution, a dispersion, or a dispersion such as an emulsion, and a suspension. The coating liquid for forming an active layer contains a p-type semiconductor material, an n-type semiconductor material, a first solvent, and can further contain a second solvent as desired. Hereinafter, the components of the coating liquid for forming an active layer of the present embodiment will be described.

Here, terms commonly used in the description of the present embodiment will be described.

The "polymer compound" refers to a polymer having molecular weight distribution and having a number average molecular weight of $1 \times 10^3$ or more and $1 \times 10^9$ or less in terms of polystyrene. The constitutional units contained in the polymer compound are 100 mol % in total.

The "constitutional unit" refers to one or more units present in a polymer compound.

The "hydrogen atom" may be a light hydrogen atom or a heavy hydrogen atom.

The "halogen atom" includes a fluorine atom, a chlorine atom, a bromine atom, and an iodine atom.

The expression "may have a substituent" includes both aspects of a case where all the hydrogen atoms constituting the compound or group are not substituted and a case where some or all of one or more hydrogen atoms are substituted with a substituent.

The "alkyl group" may be any of straight-chain, branched, or cyclic unless otherwise noted. The number of carbon atoms of the straight-chain alkyl group does not include the number of carbon atoms of the substituent, and is usually 1 to 50, preferably 1 to 30, and more preferably 1 to 20. The number of carbon atoms of each of the branched and cyclic alkyl groups does not include the number of carbon atoms of the substituent, and is usually 3 to 50, preferably 3 to 30, and more preferably 4 to 20.

The alkyl group may have a substituent. Specific examples of the alkyl group include a methyl group, an ethyl group, an n-propyl group, an isopropyl group, an n-butyl group, an isobutyl group, a tert-butyl group, an n-pentyl group, an isoamyl group, a 2-ethyl butyl group, an n-hexyl group, a cyclohexyl group, an n-heptyl group, a cyclohexylmethyl group, a cyclohexylethyl group, an n-octyl group, a 2-ethylhexyl group, a 3-n-propylheptyl group, an adamantyl group, an n-decyl group, a 3,7-dimethyloctyl group, a 2-ethyloctyl group, a 2-n-hexyl-decyl group, an n-dodecyl group, a tetradecyl group, a hexadecyl group, an octadecyl group, and an eicosyl group. Examples of the alkyl group having a substituent include a trifluoromethyl group, a pentafluoroethyl group, a perfluorobutyl group, a perfluorohexyl group, a perfluorooctyl group, a 3-phenylpropyl group, a 3-(4-methylphenyl)propyl group, a 3-(3,5-di-n-hexylphenyl)propyl group, and a 6-ethyloxyhexyl group.

The "aryl group" refers to a remaining atomic group in which one hydrogen atom directly bonded to a carbon atom constituting a ring is removed from an aromatic hydrocarbon which may have a substituent.

The aryl group may have a substituent. Specific examples of the aryl group include a phenyl group, a 1-naphthyl group, a 2-naphthyl group, a 1-anthracenyl group, a 2-anthracenyl group, a 9-anthracenyl group, a 1-pyrenyl group, a 2-pyrenyl group, a 4-pyrenyl group, a 2-fluorenyl group, a 3-fluorenyl group, a 4-fluorenyl group, a 2-phenylphenyl group, a 3-phenylphenyl group, a 4-phenylphenyl group, and a group in which these groups further have a substituent such as an alkyl group, an alkoxy group, an aryl group, and a fluorine atom.

The "alkoxy group" may be any of straight-chain, branched, and cyclic. The number of carbon atoms of the straight-chain alkoxy group does not include the number of carbon atoms of the substituent, and is usually 1 to 40, and preferably 1 to 10. The number of carbon atoms of the branched or cyclic alkoxy group does not include the number of carbon atoms of the substituent, and is usually 3 to 40, and preferably 4 to 10.

The alkoxy group may have a substituent. Specific examples of the alkoxy group include a methoxy group, an ethoxy group, an n-propyloxy group, an isopropyloxy group, an n-butyloxy group, an isobutyloxy group, a tert-butyloxy group, an n-pentyloxy group, an n-hexyloxy group, a cyclohexyloxy group, an n-heptyloxy group, an n-octyloxy group, a 2-ethylhexyloxy group, an n-nonyloxy group, an n-decyloxy group, a 3,7-dimethyloctyloxy group, and a lauryloxy group.

The number of carbon atoms of the "aryloxy group" does not include the number of carbon atoms of the substituent, and is usually 6 to 60, and preferably 6 to 48.

The aryloxy group may have a substituent. Specific examples of the aryloxy group include a phenoxy group, a 1-naphthyloxy group, a 2-naphthyloxy group, a 1-anthracenyloxy group, a 9-anthracenyloxy group, a 1-pyrenyloxy group, and a group in which these groups further have a substituent such as an alkyl group, an alkoxy group, and a fluorine atom.

The "alkylthio group" may be any of straight-chain, branched, and cyclic. The number of carbon atoms of the straight-chain alkylthio group does not include the number of carbon atoms of the substituent, and is usually 1 to 40, and preferably 1 to 10. The number of carbon atoms of the branched or cyclic alkylthio group does not include the number of carbon atoms of the substituent, and is usually 3 to 40, and preferably 4 to 10.

The alkylthio group may have a substituent. Specific examples of the alkylthio group include a methylthio group, an ethylthio group, a propylthio group, an isopropylthio group, a butylthio group, an isobutylthio group, a tert-butylthio group, a pentylthio group, a hexylthio group, a cyclohexylthio group, a heptylthio group, an octylthio group, a 2-ethylhexylthio group, a nonylthio group, a decylthio group, a 3,7-dimethyloctylthio group, a laurylthio group, and a trifluoromethylthio group.

The number of carbon atoms of the "arylthio group" does not include the number of carbon atoms of the substituent, and is usually 6 to 60, and preferably 6 to 48.

The arylthio group may have a substituent. Examples of the arylthio group include a phenylthio group, a C1-C12 alkyloxyphenylthio group (the description "C1-C12" represents that the number of carbon atoms of a group described immediately after this description is 1 to 12, the same applies hereinafter), a C1-C12 alkylphenylthio group, a 1-naphthylthio group, a 2-naphthylthio group, and a pentafluorophenyl thio group.

The "P-valent heterocyclic group" (P represents an integer of 1 or more) refers to a remaining atomic group in which P hydrogen atoms among hydrogen atoms directly bonded to a carbon atom or heteroatom constituting a ring are removed from a heterocyclic compound which may have a substituent. Among the P-valent heterocyclic groups, "P-valent aromatic heterocyclic groups" are preferable.

The "P-valent aromatic heterocyclic group" refers to a remaining atomic group in which P hydrogen atoms among hydrogen atoms directly bonded to a carbon atom or heteroatom constituting a ring are removed from an aromatic heterocyclic compound which may have a substituent.

Examples of the substituent that may be included in the heterocyclic compound include a halogen atom, an alkyl group, an aryl group, an alkoxy group, an aryloxy group, an alkylthio group, an arylthio group, a monovalent heterocyclic group, a substituted amino group, an acyl group, an imine residue, an amide group, an acid imide group, a substituted oxycarbonyl group, an alkenyl group, an alkynyl group, a cyano group, and a nitro group.

The aromatic heterocyclic compound includes compounds in which an aromatic ring is further condensed to a heterocyclic ring exhibiting no aromaticity, in addition to compounds in which a heterocyclic ring itself exhibits aromaticity.

Among the aromatic heterocyclic compounds, specific examples of the compound in which a heterocyclic ring itself exhibits aromaticity include oxadiazole, thiadiazole, thiazole, oxazole, thiophene, pyrrole, phosphole, furan, pyridine, pyrazine, pyrimidine, triazine, pyridazine, quinoline, isoquinoline, carbazole, and dibenzophosphole.

Among the aromatic heterocyclic compound, specific examples of the compound in which an aromatic ring is condensed to a heterocyclic ring exhibiting no aromaticity include phenoxazine, phenothiazine, dibenzoborole, dibenzosilole, and benzopyran.

The number of carbon atoms of the monovalent heterocyclic group does not include the number of carbon atoms of the substituent, and is usually 2 to 60, and preferably 4 to 20.

The monovalent heterocyclic group may have a substituent. Specific examples of the monovalent heterocyclic group include a thienyl group, a pyrrolyl group, a furyl group, a pyridyl group, a piperidyl group, a quinolyl group, an isoquinolyl group, a pyrimidinyl group, a triazinyl group, and a group in which these groups have a substituent such as an alkyl group, and an alkoxy group.

The "substituted amino group" refers to an amino group having a substituent. Examples of the substituent that can be included in the substituted amino group include an alkyl group, an aryl group, and a monovalent heterocyclic group. The substituent is preferably an alkyl group, an aryl group, or a monovalent heterocyclic group. The number of carbon atoms of the substituted amino group is usually 2 to 30.

Examples of the substituted amino group include dialkylamino groups such as a dimethylamino group, and a diethylamino group; and diarylamino groups such as a diphenylamino group, a bis(4-methylphenyl)amino group, a bis(4-tert-butylphenyl)amino group, and a bis(3,5-di-tert-butylphenyl)amino group.

The number of carbon atoms of the "acyl group" is usually 2 to 20, and preferably 2 to 18. Specific examples of the acyl group include an acetyl group, a propionyl group, a butyryl group, an isobutyryl group, a pivaloyl group, a benzoyl group, a trifluoroacetyl group, and a pentafluorobenzoyl group.

The "imine residue" refers to a remaining atomic group in which one hydrogen atom directly bonded to a carbon atom or a nitrogen atom constituting a carbon atom-nitrogen atom double bond is removed from an imine compound. The "imine compound" refers to an organic compound having a carbon atom-nitrogen atom double bond in the molecule. Examples of the imine compound include aldimine, ketimine, and compounds in which a hydrogen atom bonded to a nitrogen atom constituting a carbon atom-nitrogen atom double bond in aldimine is substituted with an alkyl group or the like.

The number of carbon atoms of the "imine residue" is usually from approximately 2 to 20, and preferably 2 to 18. Examples of the imine residue include groups represented by the following formula.

[Chemical Formula 1]

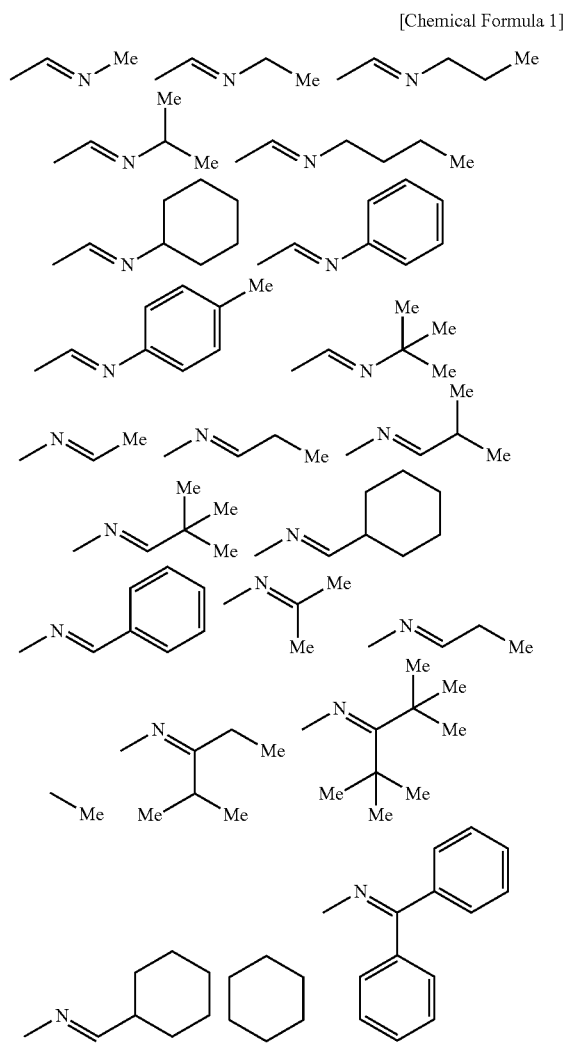

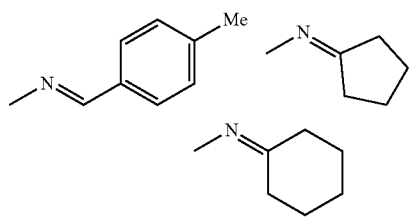

The "amide group" refers to a remaining atomic group in which one hydrogen atom bonded to a nitrogen atom is removed from amide. The number of carbon atoms of the amide group is usually 1 to 20, and preferably 1 to 18.

Specific examples of the amide group include a formamide group, an acetamide group, a propioamide group, a butyroamide group, a benzamide group, a trifluoroacetamide group, a pentafluorobenzamide group, a diformamide group, a diacetamide group, a dipropioamide group, a dibutyroamide group, a dibenzamide group, a ditrifluoroacetamide group, and a dipentafluorobenzamide group.

The "acid imide group" refers to a remaining atomic group in which one hydrogen atom bonded to a nitrogen atom is removed from acid imide. The number of carbon atoms of the acid imide group is usually 4 to 20. Specific examples of the acid imide group include groups represented by the following formula.

[Chemical Formula 2]

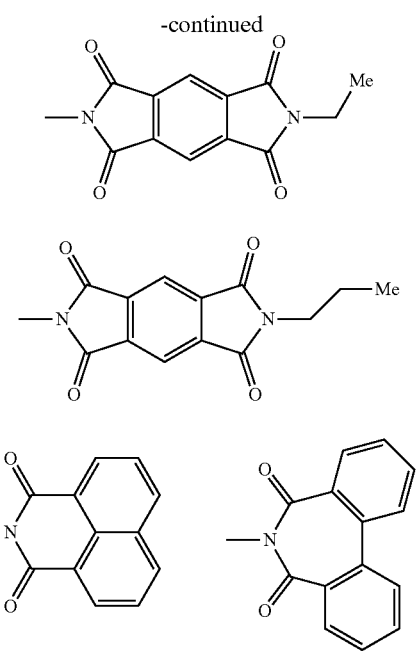

The "substituted oxycarbonyl group" refers to a group represented by R'—O—(C=O)—.

Here, R' represents an alkyl group, an arylalkyl group, or a monovalent heterocyclic group.

The number of carbon atoms of the substituted oxycarbonyl group is usually 2 to 60, and preferably 2 to 48.

Specific examples of the substituted oxycarbonyl group include a methoxycarbonyl group, an ethoxycarbonyl group, a propoxycarbonyl group, an isopropoxycarbonyl group, a butoxycarbonyl group, an isobutoxycarbonyl group, a tert-butoxycarbonyl group, a pentyloxycarbonyl group, a hexyloxycarbonyl group, a cyclohexyloxycarbonyl group, a heptyloxycarbonyl group, an octyloxycarbonyl group, a 2-ethylhexyloxycarbonyl group, a nonyloxycarbonyl group, a decyloxycarbonyl group, a 3,7-dimethyloctyloxycarbonyl group, a dodecyloxycarbonyl group, a trifluoromethoxycarbonyl group, a pentafluoroethoxycarbonyl group, a perfluorobutoxycarbonyl group, a perfluorohexyloxycarbonyl group, a perfluorooctyloxycarbonyl group, a phenoxycarbonyl group, a naphthoxycarbonyl group, and a pyridyloxycarbonyl group.

The "alkenyl group" may be any of straight-chain, branched, and cyclic. The number of carbon atoms of the straight-chain alkenyl group does not include the number of carbon atoms of the substituent, and is usually 2 to 30, and preferably 3 to 20. The number of carbon atoms of the branched or cyclic alkenyl group does not include the number of carbon atoms of the substituent, and is usually 3 to 30, and preferably 4 to 20.

The alkenyl group may have a substituent. Specific examples of the alkenyl group include a vinyl group, a 1-propenyl group, a 2-propenyl group, a 2-butenyl group, a 3-butenyl group, a 3-pentenyl group, a 4-pentenyl group, a 1-hexenyl group, a 5-hexenyl group, a 7-octenyl group, and a group in which these groups further have a substituent such as an alkyl group and an alkoxy group.

The "alkynyl group" may be any of straight-chain, branched, and cyclic. The number of carbon atoms of the straight-chain alkenyl group does not include the number of carbon atoms of the substituent, and is usually 2 to 20, and preferably 3 to 20. The number of carbon atoms of the branched or cyclic alkenyl group does not include the number of carbon atoms of the substituent, and is usually 4 to 30, and preferably 4 to 20.

The alkynyl group may have a substituent. Specific examples of the alkynyl group include an ethynyl group, a 1-propynyl group, a 2-propynyl group, a 2-butynyl group, a 3-butynyl group, a 3-pentynyl group, a 4-pentynyl, a 1-hexenyl group, a 5-hexenyl group, and a group in which these groups further have a substituent such as an alkyl group, and an alkoxy group.

(p-Type Semiconductor Material)

The p-type semiconductor material that can be contained in the active layer of the photoelectric conversion element of the present embodiment is preferably a polymer compound having a predetermined weight average molecular weight in terms of polystyrene.

Here, the weight average molecular weight in terms of polystyrene refers to the weight average molecular weight calculated by using gel permeation chromatography (GPC) using a polystyrene as a standard sample.

The weight average molecular weight in terms of polystyrene of the p-type semiconductor material which is a polymer compound is preferably 40,000 or more and 200,000 or less, and more preferably 40,000 or more and 150,000 or less particularly from the viewpoint of reducing the dark current ratio. The weight average molecular weight is even more preferably 45,000 or more and 150,000 or less particularly from the viewpoint of improving the solubility in a solvent.

Examples of the p-type semiconductor material of the present embodiment include polyvinylcarbazole and derivatives thereof, polysilane and derivatives thereof, polysiloxane derivatives containing an aromatic amine structure in a side chain or the main chain, polyaniline and derivatives thereof, polythiophene and derivatives thereof, polypyrrole and derivatives thereof, polyphenylene vinylene and derivatives thereof, polythienylene vinylene and derivatives thereof, and polyfluorene and derivatives thereof.

The p-type semiconductor material is preferably a polymer compound containing a constitutional unit represented by the following Formula (I) and/or a constitutional unit represented by the following Formula (II).

[Chemical Formula 3]

(I)

In Formula (I), Z represents a group represented by any of the following Formulae (Z-1) to (Z-7). $Ar^1$ and $Ar^2$ represent a trivalent aromatic heterocyclic group which may be the same or different.

[Chemical Formula 4]

(II)

In Formula (II), Ar² represents a divalent aromatic heterocyclic group.

[Chemical Formula 5]

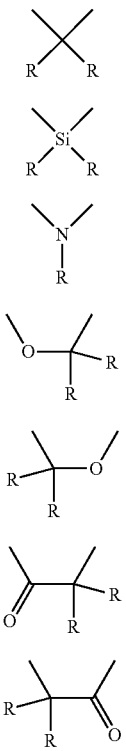

(Z-1)
(Z-2)
(Z-3)
(Z-4)
(Z-5)
(Z-6)
(Z-7)

In Formulae (Z-1) to (Z-7), R represents a hydrogen atom, a halogen atom, an amino group, an alkyl group, an aryl group, an alkoxy group, an aryloxy group, an alkylthio group, an arylthio group, a monovalent heterocyclic group, a substituted amino group, an acyl group, an imine residue, an amide group, an acid imide group, a substituted oxycarbonyl group, an alkenyl group, an alkynyl group, a cyano group, and a nitro group. In each of Formulae (Z-1) to (Z-7), when there are two Rs, they may be the same or different from each other.

The constitutional unit represented by Formula (I) is preferably a constitutional unit represented by the following Formula (I-1).

[Chemical Formula 6]

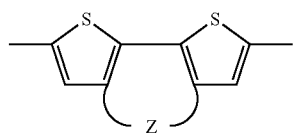

(I-1)

In Formula (I-1), Z represents the same meaning as described above.

Z is preferably a group represented by any of Formulae (Z-4) to (Z-7).

Examples of the constitutional unit represented by Formula (I-1) include constitutional units represented by the following Formulae (501) to (505).

[Chemical Formula 7]

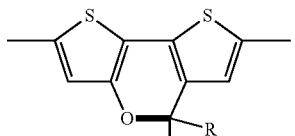

(501)

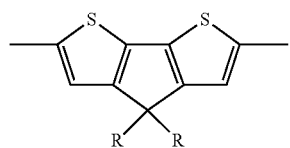

(502)

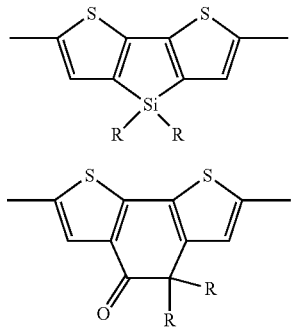

(503)

(504)

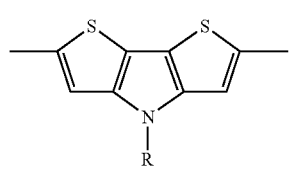

(505)

In Formulae (501) to (505), R represents the same meaning as described above. When there are two Rs, they may be the same or different from each other.

Among the constitutional units represented by Formulae (501) to (505), a constitutional unit represented by the following formula is preferable.

[Chemical Formula 8]

In the formula, R represents the same meaning as described above. Two Rs may be the same or different from each other.

The number of carbon atoms of the divalent aromatic heterocyclic group represented by Ar³ is usually 2 to 60, preferably 4 to 60, and more preferably 4 to 20. The divalent aromatic heterocyclic group represented by Ar³ may have a substituent. Examples of the substituent represented by Ar³ which may be included in the divalent aromatic heterocyclic group include a halogen atom, an amino group, an alkyl group, an aryl group, an alkoxy group, an aryloxy group, an alkylthio group, an arylthio group, a monovalent heterocyclic group, a substituted amino group, an acyl group, an imine residue, an amide group, an acid imide group, a substituted oxycarbonyl group, an alkenyl group, an alkynyl group, a cyano group, and a nitro group.

Examples of the divalent aromatic heterocyclic group represented by $Ar^3$ include groups represented by the following Formulae (101) to (185).

[Chemical Formula 9]

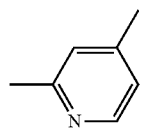
(101)

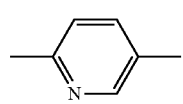
(102)

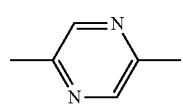
(103)

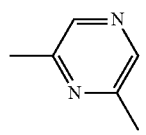
(104)

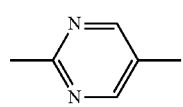
(105)

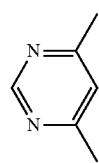
(106)

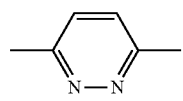
(107)

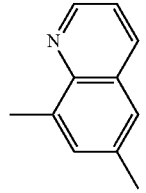
(108)

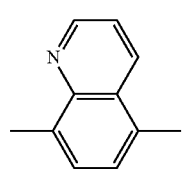
(109)

-continued

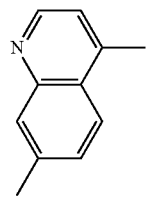
(110)

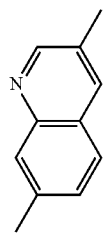
(111)

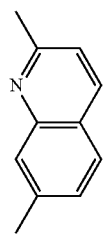
(112)

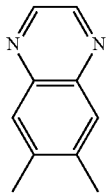
(113)

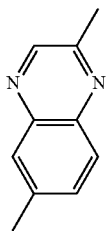
(114)

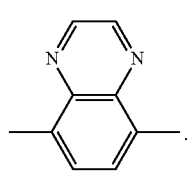
(115)

[Chemical Formula 10]
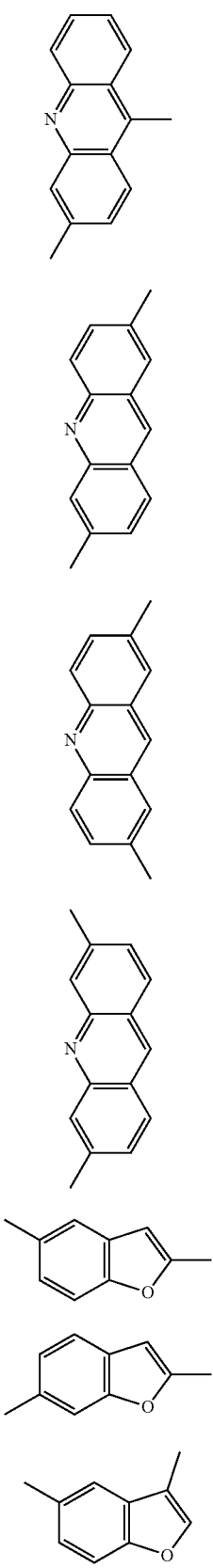
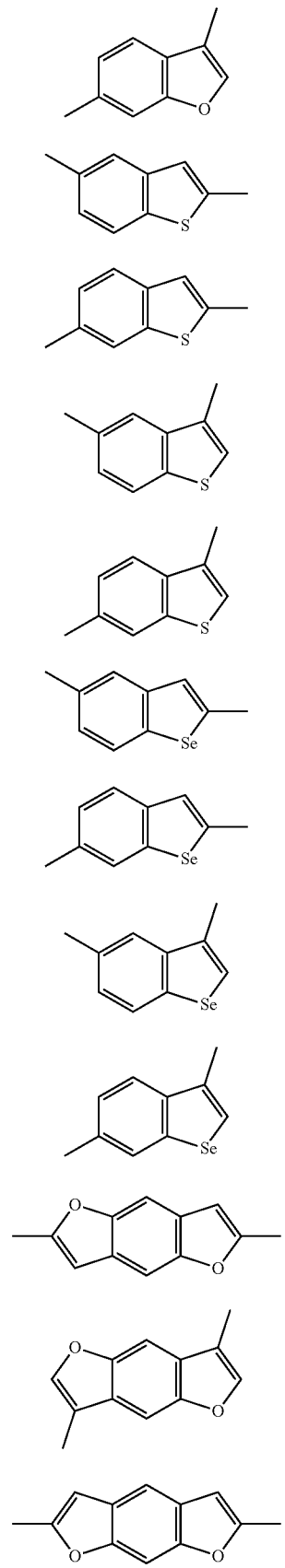

-continued
(135) 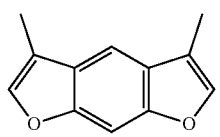
(136) 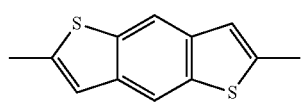
(137) 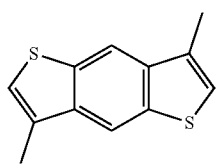
(138) 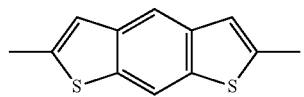
(139) 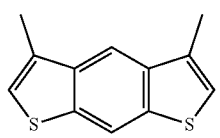
[Chemical Formula 11]
(140) 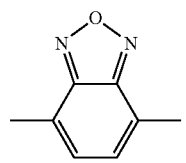
(141) 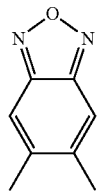
(142) 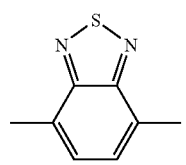
(143) 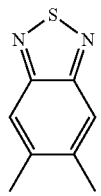
-continued
(144) 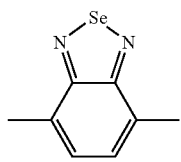
(145) 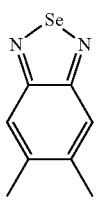
(146) 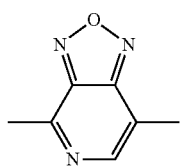
(147) 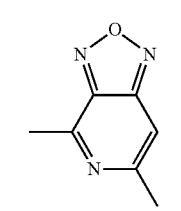
(148) 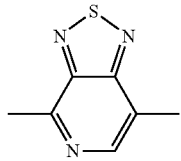
(149) 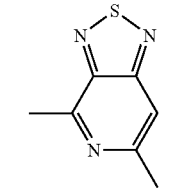
(150) 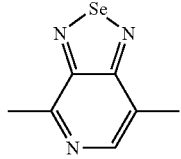
(151) 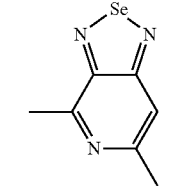

(152) 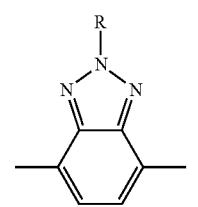
(153) 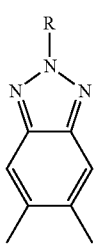
(154) 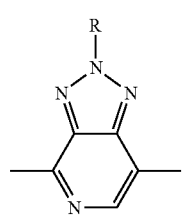
(155) 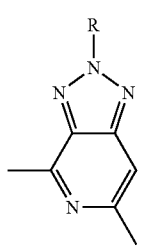
(156) 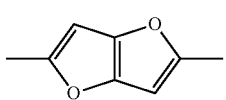
(157) 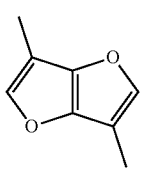
(158) 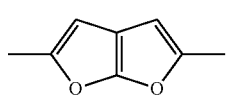
(159) 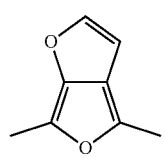
(160) 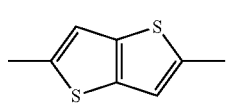
(161) 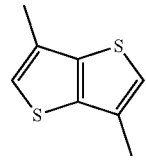
(162) 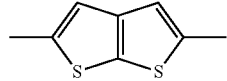
(163) 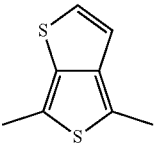
(164) 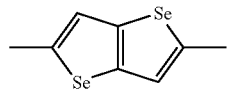
(165) 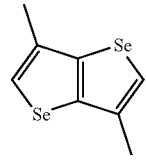
(166) 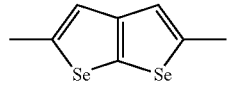
(167) 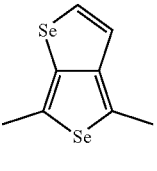
[Chemical Formula 12]
(168) 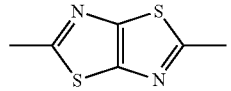
(169) 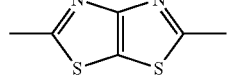
(170) 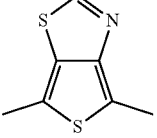
(171) 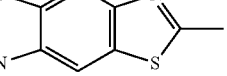

In Formulae (101) to (185), R represents the same meaning as described above. When there are a plurality of Rs, they may be the same or different from each other.

Examples of the constitutional unit represented by Formula (II) are preferably constitutional units represented by the following Formulae (II-1) to (II-6).

[Chemical Formula 13]

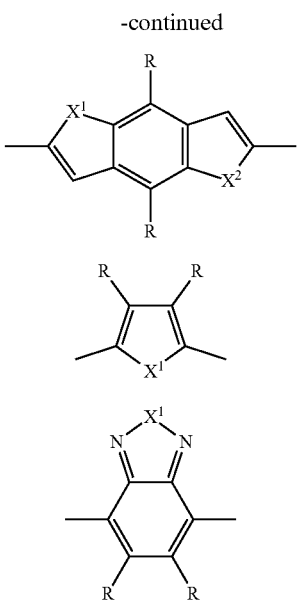

In Formulae (II-1) to (II-6), $X^1$ and $X^2$ each independently represent an oxygen atom or a sulfur atom, and R represents the same meaning as described above. When there are a plurality of Rs, they may be the same or different from each other.

$X^1$ and $X^2$ in Formulae (II-1) to (II-6) are both preferably a sulfur atom from the viewpoint of availability of raw material compounds.

The P-type semiconductor material is preferably a polymer compound containing a constitutional unit containing a thiophene backbone.

The polymer compound which is a P-type semiconductor material may contain two or more types of constitutional units of Formula (I), or may contain two or more types of constitutional units of Formula (II).

The polymer compound which is a P-type semiconductor material may contain a constitutional unit represented by the following Formula (III) in order to improve the solubility in a solvent.

[Chemical Formula 14]

$$—Ar^4—\quad\text{(III)}$$

In Formula (III), $Ar^4$ represents an arylene group.

The "arylene group" represented by $Ar^4$ refers to a remaining atomic group in which two hydrogen atoms are removed from an aromatic hydrocarbon which may have a substituent. The aromatic hydrocarbon includes compounds having a condensed ring, and compounds in which two or more selected from the group consisting of independent benzene rings and condensed rings are directly bonded or bonded via a divalent group such as a vinylene group.

Examples of the substituent that may be included in the aromatic hydrocarbon include substituents same as those exemplified as a substituent that may be included in the heterocyclic compound.

The number of carbon atoms of a moiety excluding the substituent in the arylene group is usually 6 to 60, and preferably 6 to 20. The number of carbon atoms of the arylene group including the substituent is usually 6 to 100.

Examples of the arylene group include phenylene groups (for example, the following Formulae 1 to 3), naphthalenediyl groups (for example, the following Formulae 4 to 13), anthracendiyl groups (for example, the following Formulae 14 to 19), biphenyldiyl groups (for example, the following Formulae 20 to 25), terphenyldiyl groups (for example, the following Formulae 26 to 28), condensed-ring compound groups (for example, the following Formulae 29 to 35), fluorenediyl groups (for example, the following Formulae 36 to 38), and benzofluorenediyl groups (for example, the following Formulae 39 to 46).

[Chemical Formula 15]

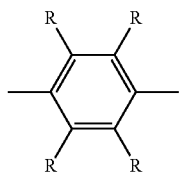

1

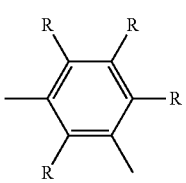

2

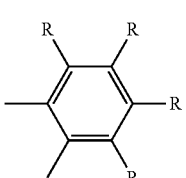

3

[Chemical Formula 16]

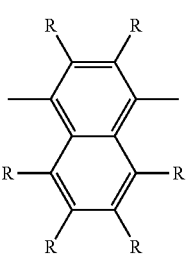

4

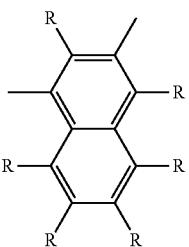

5

33
-continued
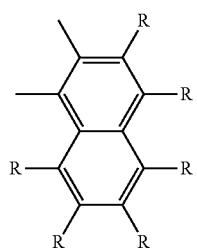
6
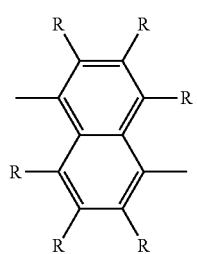
7
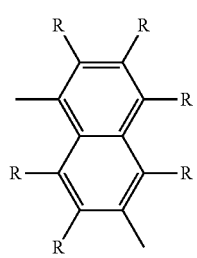
8
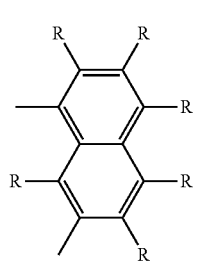
9
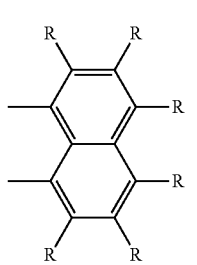
10
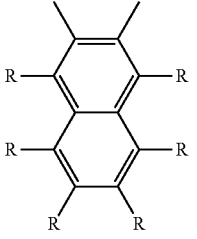
11
34
-continued
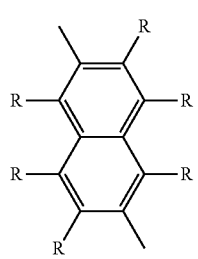
12
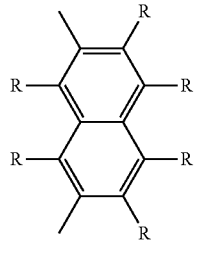
13
[Chemical Formula 17]
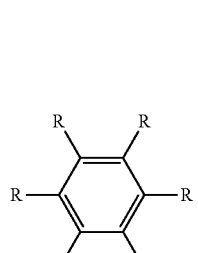
14
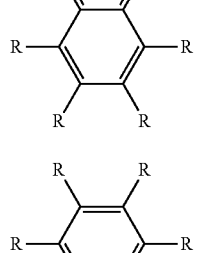
15
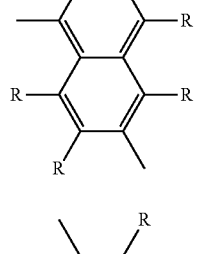
16
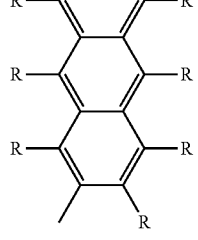

-continued
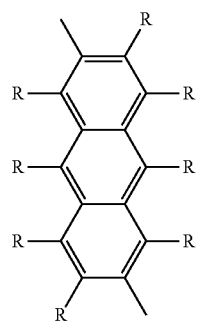
17
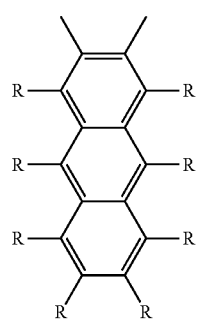
18
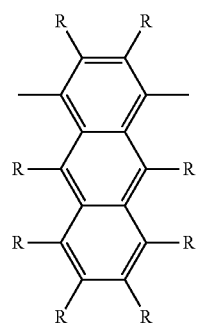
19
[Chemical Formula 18]
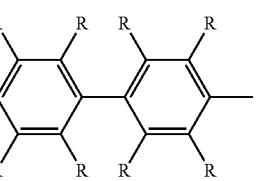
20
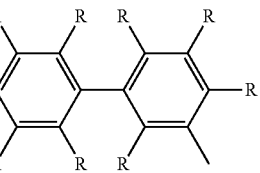
21
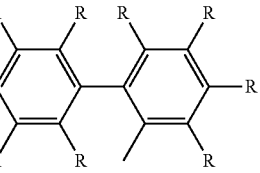
22
-continued
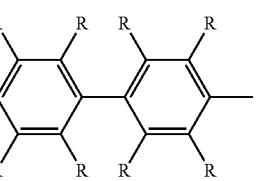
23
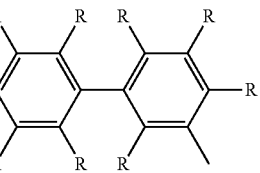
24
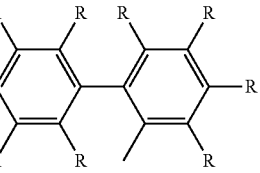
25
[Chemical Formula 19]
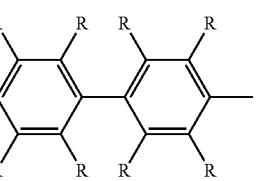
26
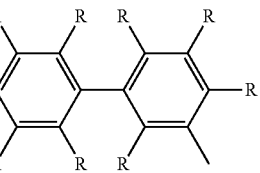
27
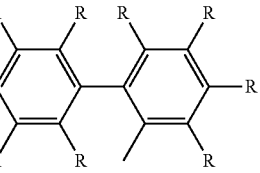
28

[Chemical Formula 20]
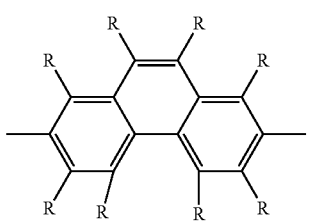
29
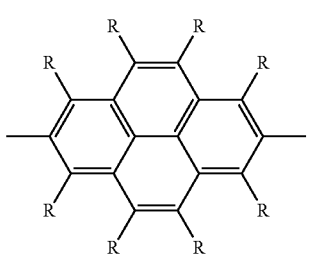
30
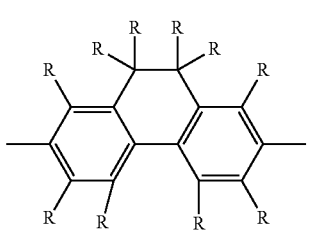
31
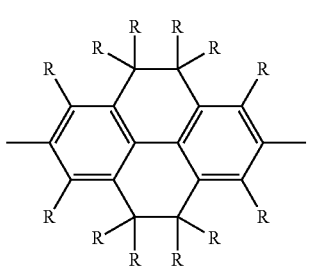
32
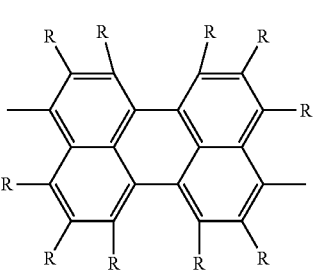
33
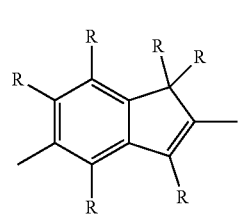
34
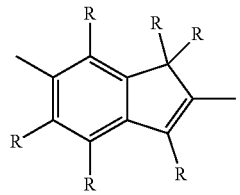
35
[Chemical Formula 21]
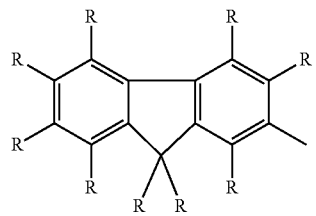
36
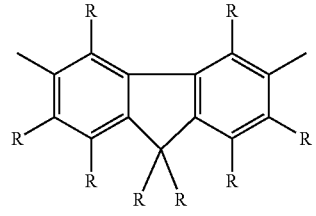
37
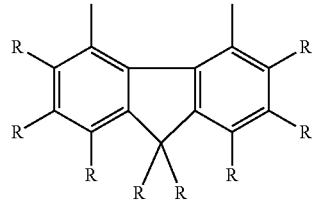
38
[Chemical Formula 22]
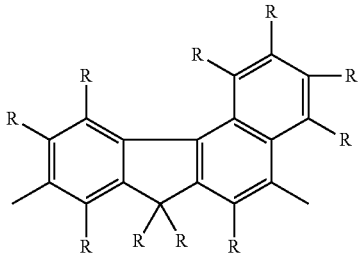
39
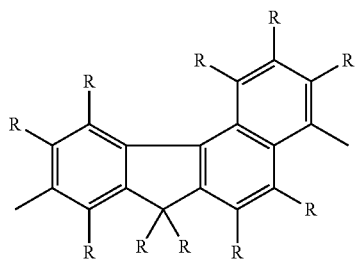
40

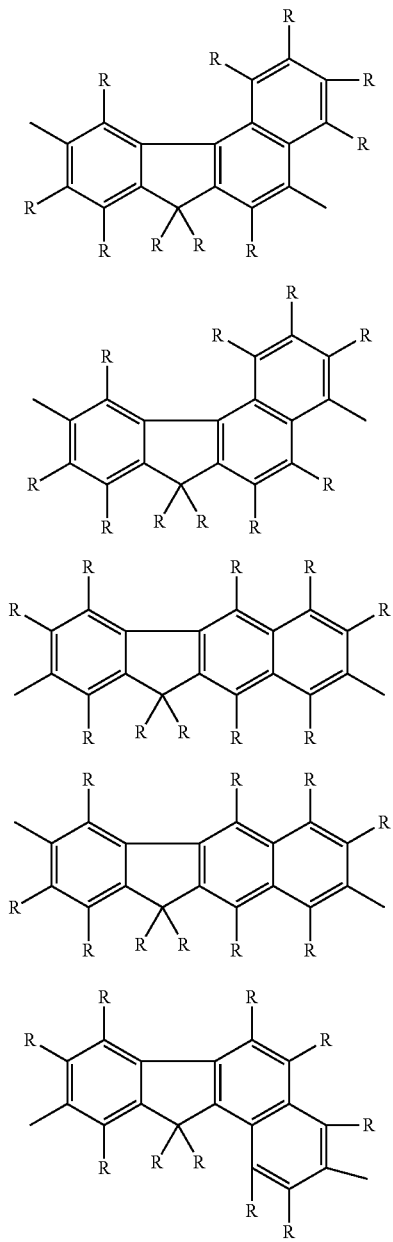

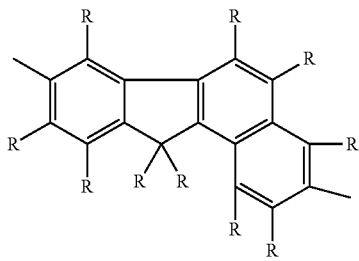

In Formulae 1 to 46, R which is a substituent represents the same meaning as described above. A plurality of Rs may be the same or different from each other.

The constitutional unit constituting a polymer compound which is a p-type semiconductor material may be a constitutional unit formed by combining two or more of two or more constitutional units selected from the constitutional unit represented by Formula (I), the constitutional unit represented by Formula (II), and the constitutional unit represented by Formula (III).

In a case where the polymer compound as a p-type semiconductor material contains the constitutional unit represented by Formula (I) and/or the constitutional unit represented by Formula (II), the total amount of the constitutional unit represented by Formula (I) and the constitutional unit represented by Formula (II) is usually 20 to 100 mol % in all constitutional units contained in the polymer compound (100 mol %). The total amount is preferably 40 to 100 mol, and more preferably 50 to 100 mol % because the charge transportability as the p-type semiconductor material can be improved.

Specific examples of the polymer compound which is a p-type semiconductor material include polymer compounds represented by the following Formulae P-1 to P-6.

[Chemical Formula 23]

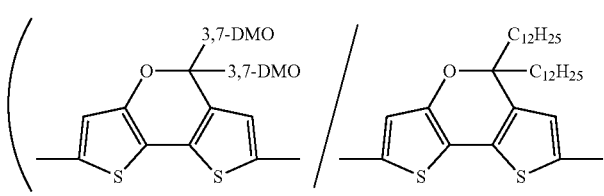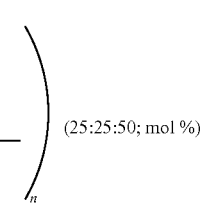

P-1

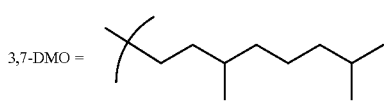

-continued
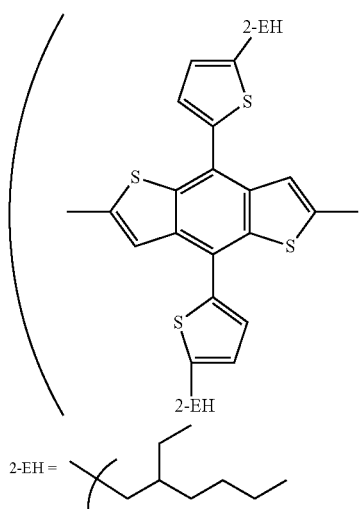
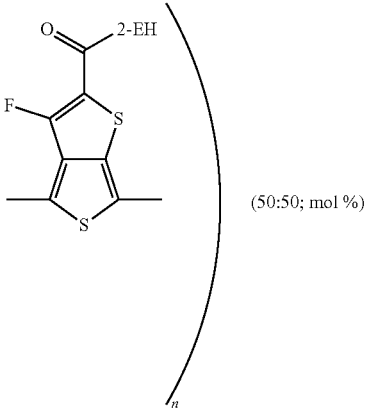
P-2
(50:50; mol %)
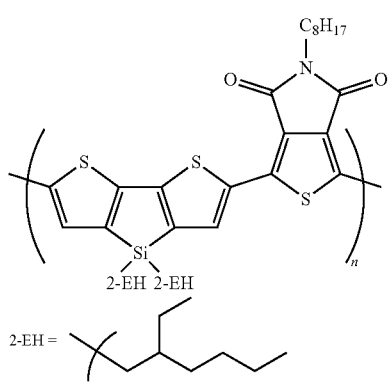
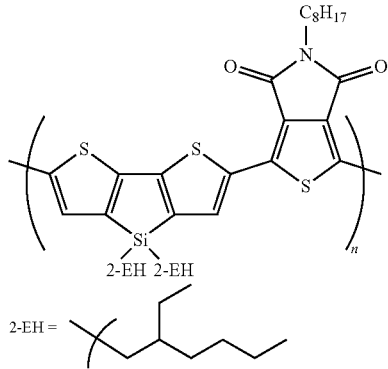
P-3
[Chemical Formula 24]
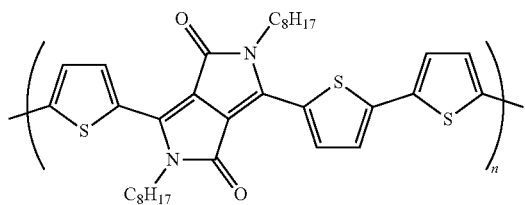
P-4
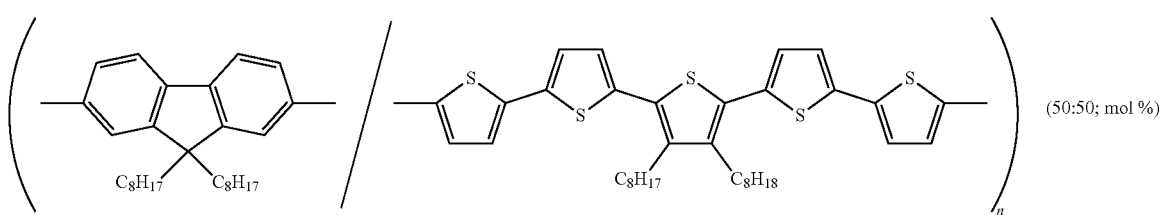
P-5
(50:50; mol %)

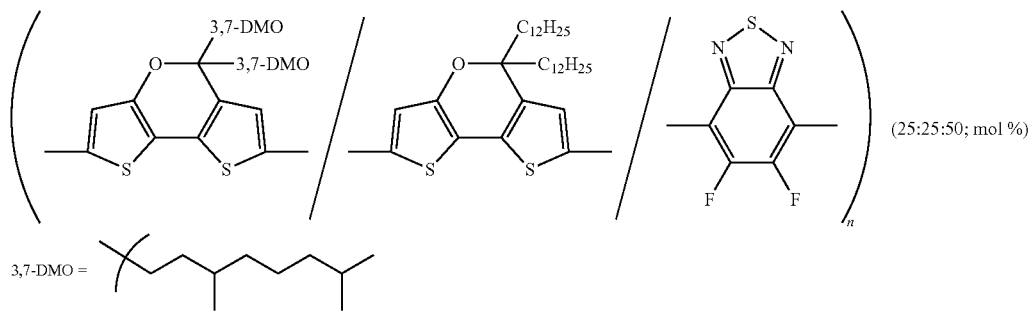

The coating liquid for forming an active layer of the present embodiment may contain only one type of p-type semiconductor material, or may contain a combination of two or more types at a discretionary ratio.

(n-Type Semiconductor Material)

The n-type semiconductor material (electron-accepting compound) that can be contained in the active layer of the present embodiment can be selected in consideration of the work function of the electron transportation layer, such that the difference between the work function of the electron transportation layer and the energy level of the LUMO of the n-type semiconductor material is 0.06 eV or more as described above.

The n-type semiconductor material may be a low molecular weight compound or a polymer compound.

Examples of the n-type semiconductor material which is a low molecular weight compound include oxadiazole derivatives, anthraquinodimethane and derivatives thereof, benzoquinone and derivatives thereof, naphthoquinone and derivatives thereof, anthraquinone and derivatives thereof, tetracyanoanthraquinodimethane and derivatives thereof, fluorenone derivatives, diphenyldicyanoethylene and derivatives thereof, diphenoquinone derivatives, metal complexes of 8-hydroxyquinoline and derivatives thereof, fullerenes such as $C_{60}$ fullerene and derivatives thereof, and phenanthrene derivatives such as bathocuproine.

Examples of the n-type semiconductor material which is a polymer compound include polyvinylcarbazole and derivatives thereof, polysilane and derivatives thereof, polysiloxane derivatives having an aromatic amine structure in a side chain or the main chain, polyaniline and derivatives thereof, polythiophene and derivatives thereof, polypyrrole and derivatives thereof, polyphenylene vinylene and derivatives thereof, polythienylene vinylene and derivatives thereof, polyquinoline and derivatives thereof, polyquinoxaline and derivatives thereof, and polyfluorene and derivatives thereof.

The n-type semiconductor material is preferably one or more type selected from fullerenes and fullerene derivatives, and fullerene derivatives are more preferable.

Examples of the fullerene include $C_{60}$ fullerene, $C_{70}$ fullerene, $C_{76}$ fullerene, $C_{76}$ fullerene, and $C_{34}$ fullerene. Examples of the fullerene derivative include derivatives of these fullerenes. The fullerene derivative refers to a compound in which at least a part of fullerene has been modified.

Examples of the fullerene derivative include compounds represented by the following Formulae (N-1) to (N-4).

[Chemical Formula 25]

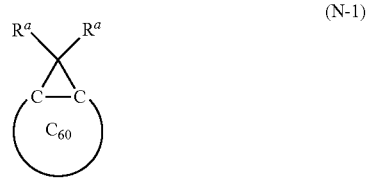
(N-1)

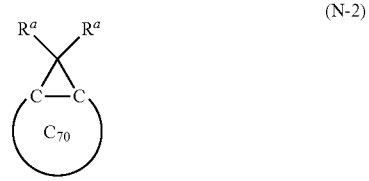
(N-2)

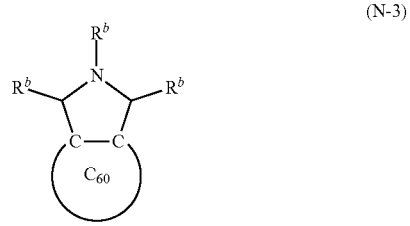
(N-3)

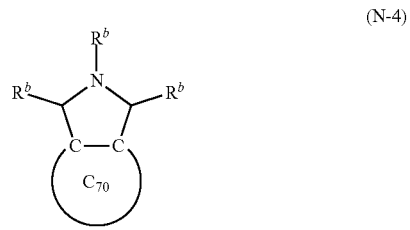
(N-4)

In Formulae (N-1) to (N-4), $R^a$ represents an alkyl group, an aryl group, a monovalent heterocyclic group, or a group having an ester structure. A plurality of $R^a$s may be the same or different from each other.

$R^b$ represents an alkyl group or an aryl group. A plurality of $R^b$s may be the same or different from each other.

Examples of the group having an ester structure represented by $R^a$ include a group represented by the following Formula (19).

[Chemical Formula 26]
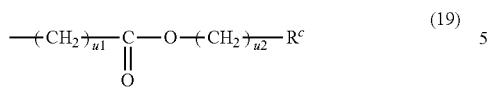
In Formula (19), u1 represents an integer of 1 to 6. u2 represents an integer of 0 to 6. $R^c$ represents an alkyl group, an aryl group, or a monovalent heterocyclic group.
Examples of the $C_{60}$ fullerene derivative include the following compounds.
[Chemical Formula 27]
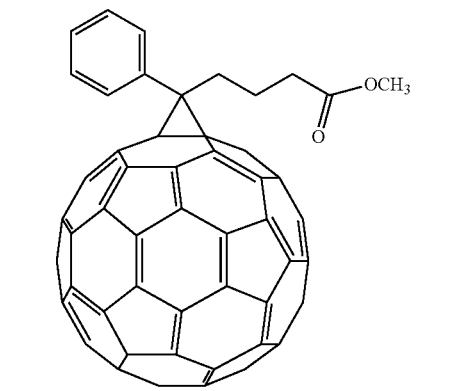
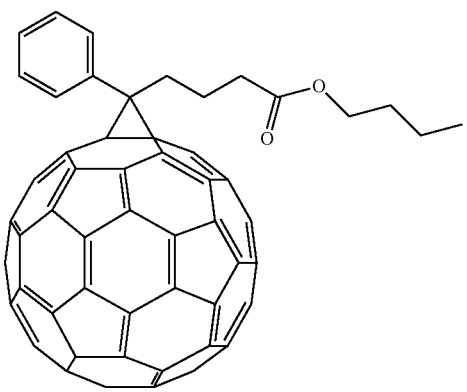
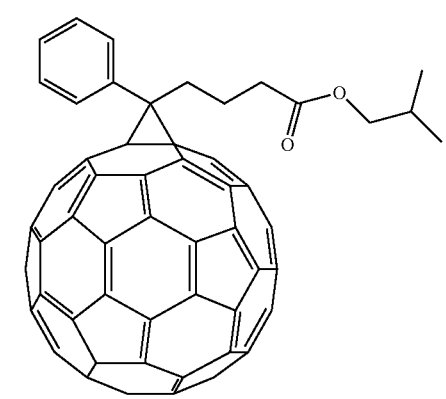
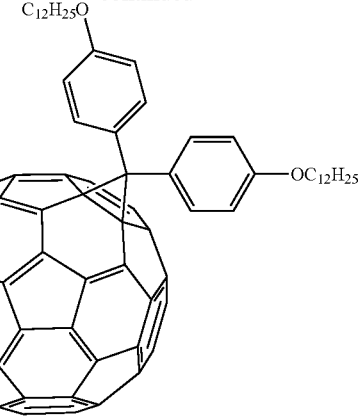
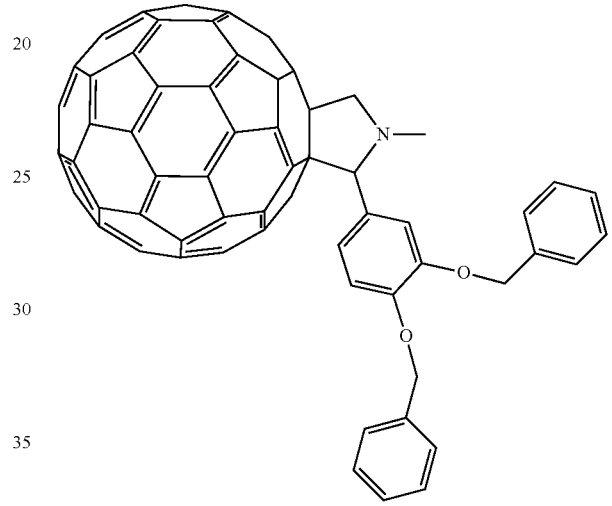
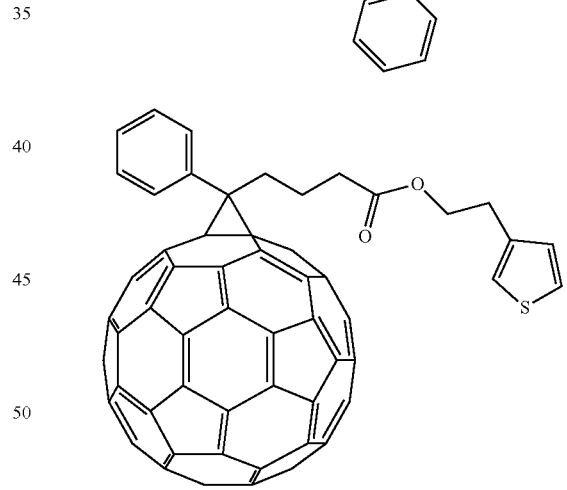
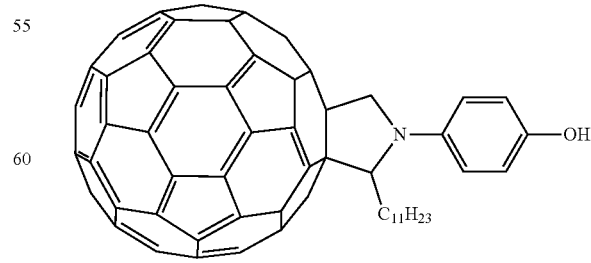
Examples of the C70 fullerene derivative include the following compounds.

[Chemical Formula 28]

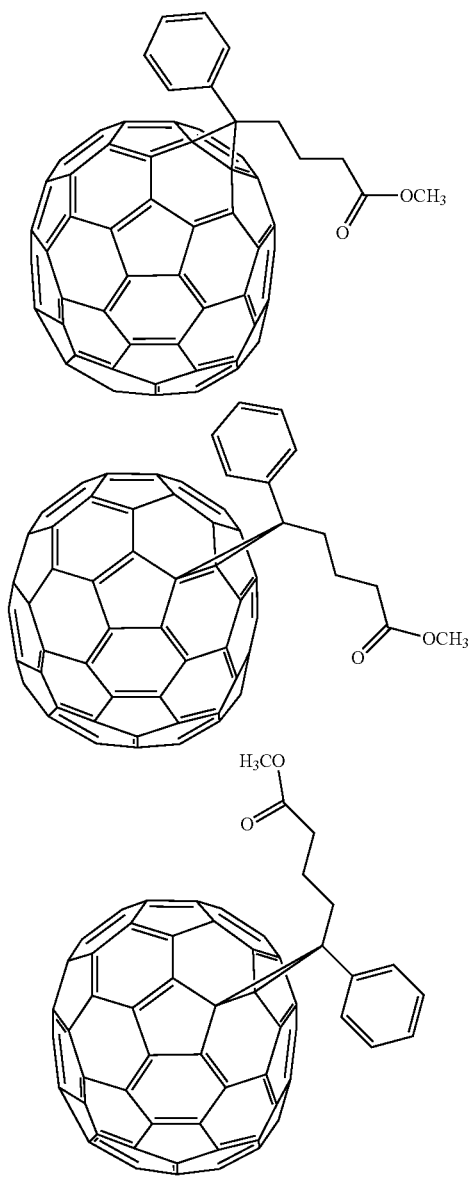

Specific examples of the fullerene derivative include [6,6]-phenyl-C61 butyric acid methyl ester (C60PCBM, [6,6]-Phenyl C61 butyric acid methyl ester), [6,6]-phenyl-C71 butyric acid methyl ester (C70PCBM, [6,6]-Phenyl C71 butyric acid methyl ester), [6,6]-phenyl-C85 butyric acid methyl ester (C84PCBM, [6,6]-Phenyl C85 butyric acid methyl ester), and [6,6]-thienyl-C61 butyric acid methyl ester ([6,6]-Thienyl C61 butyric acid methyl ester).

The coating liquid for forming an active layer of the present embodiment may contain only one type of n-type semiconductor material, or may contain a combination of two or more types at a discretionary ratio.

(First Solvent)

The solvent may be selected considering the solubility for the selected p-type semiconductor material and the n-type semiconductor material, and the characteristics corresponding to the drying conditions in the formation of the active layer (such as the boiling point).

The first solvent, which is a main solvent (good solvent), is an aromatic hydrocarbon which may have a substituent (for example, an alkyl group, and a halogen atom) (hereinafter, simply referred to as an aromatic hydrocarbon). The first solvent is preferably selected considering the solubility for the selected p-type semiconductor material and the n-type semiconductor material.

Examples of such an aromatic hydrocarbon include toluene, xylenes (for example, o-xylene, m-xylene, and p-xylene), trimethylbenzenes (for example, mesitylene, and 1,2,4-trimethylbenzene (pseudocumene)), butylbenzenes (for example, n-butylbenzene, sec-butylbenzene, and tert-butylbenzene), methylnaphthalenes (for example, 1-methylnaphthalene), tetralin, indan, chlorobenzene, and dichlorobenzene (o-dichlorobenzene).

The first solvent may be composed of only one type of aromatic hydrocarbon, or composed of two or more types of aromatic hydrocarbons. The first solvent is preferably composed of only one type of aromatic hydrocarbon.

The first solvent preferably contains one or more type selected from the group consisting of toluene, o-xylene, m-xylene, p-xylene, mesitylene, pseudocumene, n-butylbenzene, sec-butylbenzene, tert-butylbenzene, methylnaphthalene, tetralin, indan, chlorobenzene, and o-dichlorobenzene, and more preferably contains o-xylene, pseudocumene, tetralin, chlorobenzene, or o-dichlorobenzene.

(Second Solvent)

The second solvent (poor solvent) is a solvent selected from the viewpoint of increasing the solubility particularly for the n-type semiconductor material. Examples of the second solvent include ketone solvents such as acetone, methyl ethyl ketone, cyclohexanone, acetophenone, and propiophenone; and ester solvents such as ethyl acetate, butyl acetate, phenyl acetate, ethyl cellosolve acetate, methyl benzoate, butyl benzoate, and benzyl benzoate.

The second solvent is preferably acetophenone, propiophenone, or benzyl benzoate.

(Combination of First Solvent and Second Solvent)

Examples of the combination of the first solvent and the second solvent include combinations listed in Table 1

TABLE 1

| First solvent | Second solvent |
| --- | --- |
| o-Xylene | Acetophenone |
| Pseudocumene | Benzyl benzoate |
| Tetralin | Propiophenone |
| Pseudocumene | Propiophenone |

(Weight Ratio of First Solvent and Second Solvent)

The weight ratio of the first solvent to the second solvent (first solvent/second solvent) is preferably in a range of 85/15 to 97/3 from the viewpoint of further improving the solubility for the p-type semiconductor material and the n-type semiconductor material.

(Weight Percentage of Total of First Solvent and Second Solvent in Coating Liquid for Forming Active Layer)

The total weight of the first solvent and the second solvent contained in the coating liquid for forming an active layer of the present embodiment is preferably 90 wt. or more, more preferably 92 wt. % or more, and even more preferably 95 wt. %, or more when the total weight of the coating liquid for forming an active layer is 100 wt. %, from the viewpoint of further improving the solubility for the p-type semiconductor material and the n-type semiconductor material. Also, the total weight is preferably 99 wt. % or less, more preferably 98 wt. % or less, and even more preferably 97.5 wt. % or less from the viewpoint that increase in the concentration of the p-type semiconductor material and the n-type semiconductor material in the coating liquid for forming an active layer facilitates formation of a layer having a predetermined thickness or more.

(Optional Solvent)

The coating liquid for forming an active layer of the present embodiment may contain an optional solvent other than the first solvent and the second solvent. The content of the optional solvent is preferably 5 wt. %, or less, more preferably 3 wt. % or less, and even more preferably 1 wt. % or less when the total weight of the entire solvent contained in the coating liquid for forming an active layer is 100 wt. %. The optional solvent is preferably a solvent having a boiling point higher than that of the second solvent.

(Optional Components)

The coating liquid for forming an active layer of the present embodiment may contain optional components such as a ultraviolet absorber, an antioxidant, a sensitizer for sensitizing a function of generating charges by absorbed light, and a photostabilizer for increasing the stability against ultraviolet rays, in addition to the first solvent, the second solvent, the p-type semiconductor material, and the n-type semiconductor material, to the extent that the objects and effects of the present invention are not impaired.

(Concentration of p-Type Semiconductor Material and n-Type Semiconductor Material in Coating Liquid for Forming Active Layer)

The concentration of the total of the p-type semiconductor material and the n-type semiconductor material in the coating liquid for forming an active layer of the present embodiment is preferably 0.01 wt. % or more and 20 wt. % or less, more preferably 0.01 wt. % or more and 10 wt. % or less, even more preferably 0.01 wt. % or more and 5 wt. % or less, and particularly preferably 0.1 wt. % or more and 5 wt. or less. In the coating liquid for forming an active layer, the p-type semiconductor material and the n-type semiconductor material may be dissolved or dispersed. Preferably, at least a part of the p-type semiconductor material and the n-type semiconductor material is dissolved, and more preferably, all of them are dissolved.

(Preparation of Coating Liquid for Forming Active Layer)

The coating liquid for forming an active layer of the present embodiment can be prepared by a publicly known method. For example, the coating liquid for forming an active layer of the present embodiment can be prepared by, for example, a method of mixing a first solvent and a second solvent to prepare a mixed solvent, and then adding a p-type semiconductor material and an n-type semiconductor material to the obtained mixed solvent, and a method of adding a p-type semiconductor material to a first solvent and adding an n-type semiconductor material to a second solvent, and then mixing the first solvent and the second solvent to which each material has been added.

The first solvent and the second solvent, and the p-type semiconductor material and the n-type semiconductor material may be mixed while heating these materials at a temperature equal to lower than the boiling point of the solvent.

After mixing of the first solvent and the second solvent, and the p-type semiconductor material and the n-type semiconductor material, the obtained mixture is filtrated with a filter, and the resulting filtrate may be used as ink. As the filter, a filter made of a fluororesin such as polytetrafluoroethylene (PTFE) can be used, for example.

(Application of Photoelectric Conversion Element)

The photoelectric conversion element of the present embodiment can generate a photovoltaic power between the electrodes when it is irradiated with light, and thus can be operated as a solar cell. Further, the photoelectric conversion element of the present embodiment can be used as a thin film solar cell module by integrating a plurality of such solar cells.

Further, the photoelectric conversion element of the present embodiment allows photocurrent to flow by irradiating light from the transparent or translucent electrode side in a state in which a voltage is applied between electrodes. Thus, the photoelectric conversion element of the present embodiment can be operated as a photodetection element (photosensor). Further, the photoelectric conversion element of the present embodiment can be used as an image sensor by integrating a plurality of such photosensors.

(Application Example of Photoelectric Conversion Element)

The photoelectric conversion element according to an embodiment of the present invention which has been described can be suitably applied to a detection part included in various electronic devices such as work stations, personal computers, portable information terminals, entering/leaving management systems, digital cameras, and medical appliances.

The photoelectric conversion element (photodetection element) of the present invention can be suitably applied to, for example, an image detection part (image sensor) for solid-state imaging devices such as an X-ray imaging device and a CMOS image sensor; a detection part for detecting predetermined characteristics of a part of the living body, such as a fingerprint detection part, a face detection part, a vein detection part, and an iris detection part; and a detection part of optional biosensors such as a pulse oximeter, which are included in the above exemplified electronic devices.

Hereinafter, among detection parts to which the photoelectric conversion element according to an embodiment of the present invention can be suitably applied, configuration examples of an image detection part for a solid-state imaging device and a fingerprint detection part for a biological information authentication device (fingerprint authentication device) will be described with reference to the drawings.

(Image Detection Part)

Figure 2:
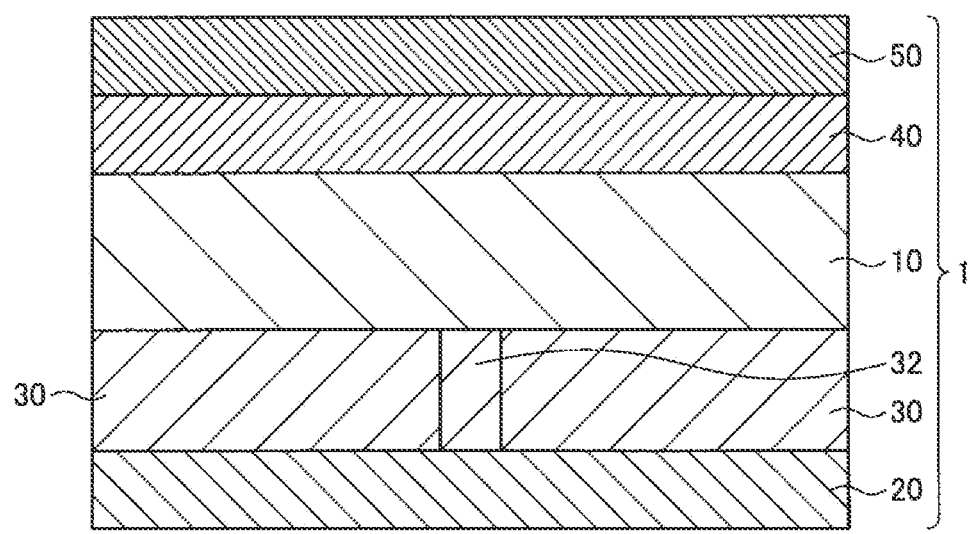
FIG. 2 is a schematic view illustrating a configuration example of an image detection part.

FIG. 2 is a schematic view illustrating a configuration example of an image detection part for a solid-state imaging device.

The image detection part 1 includes a CMOS transistor substrate 20, an interlayer insulating film 30 provided so as to cover the CMOS transistor substrate 20, a photoelectric conversion element 10 according to an embodiment of the present invention provided on the interlayer insulating film 30, an interlayer wiring part 32 provided so as to penetrate the interlayer insulating film 30 and electrically connecting the CMOS transistor substrate 20 and the photoelectric conversion element 10, a sealing layer 40 provided so as to cover the photoelectric conversion element 10, and a color filter 50 provided on the sealing layer 40.

The CMOS transistor substrate 20 includes any preferred publicly known components in an aspect according to the design.

The CMOS transistor substrate 20 includes a transistor, a capacitor, and the like formed within the thickness of the substrate. The CMOS transistor substrate 20 includes functional elements such as a CMOS transistor circuit (MOS transistor circuit) for achieving various functions.

Examples of the functional element include a floating diffusion, a reset transistor, an output transistor, and a selection transistor.

In the CMOS transistor substrate 20, a signal reading circuit and the like is fabricated with such a functional element and wiring.

The interlayer insulating film 30 can be formed of any preferred publicly known insulating material such as silicon oxide, and an insulating resin, for example. The interlayer wiring part 32 can be formed of any preferred publicly known conductive material (wiring material) such as copper, and tungsten, for example. The interlayer wiring part 32 may be, for example, a wiring in the hole, formed simultaneously with formation of a wiring layer, or an embedded plug formed separately from the wiring layer.

The sealing layer 40 can be formed of any preferred publicly known material on the condition that permeation of harmful substances such as oxygen and water, which may deteriorate the function of the photoelectric conversion element 10, can be prevented or suppressed. The sealing layer 40 may be composed of the sealing substrate 17 which has been described.

As the color filter 50, a primary color filter, which is formed of any preferred publicly known material and corresponds to the design of the image detection part 1, can be used, for example. As the color filter 50, a complementary color filter, which enables to increase the thickness compared to the primary color filter, can also be used. As the complementary color filter, color filters of the following combination of three types of (yellow, cyan, magenta), three types of (yellow, cyan, transparent), three types of (yellow, transparent, magenta), and three types of (transparent, cyan, magenta) can be used, for example. These filters can be optionally and suitably arranged according to the design of the photoelectric conversion element 10 and the CMOS transistor substrate 20 on the condition that color image data can be generated.

Light received in the photoelectric conversion element 10 though the color filter 50 is converted into an electric signal corresponding to the received light amount by the photoelectric conversion element 10, and then output outside the photoelectric conversion element 10 via the electrode, as a received light signal, that is, an electric signal corresponding to an imaging target.

Then, the received light signal output from the photoelectric conversion element 10 is received as input in the CMOS transistor substrate 20 via the interlayer wiring part 32, and then read by the signal reading circuit fabricated in the CMOS transistor substrate 20 and subjected to signal processing in any preferred publicly known functional part (not illustrated). Thus, image information based on the imaging target can be generated.

(Fingerprint Detection Part)

Figure 3:
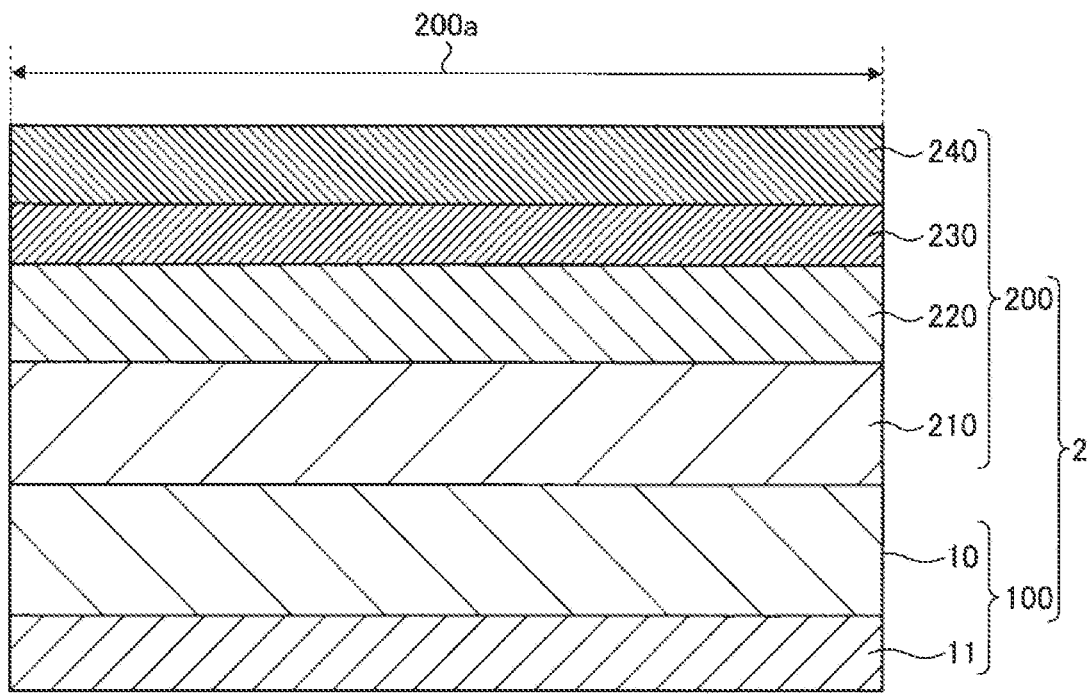
FIG. 3 is a schematic view illustrating a configuration example of a fingerprint detection part.

FIG. 3 is a schematic view illustrating a configuration example of a fingerprint detection part integrally formed in a display device.

A display device 2 of a portable information terminal includes a fingerprint detection part 100 including the photoelectric conversion element 10 according to an embodiment of the present invention as a main component, and a display panel part 200 provided on the fingerprint detection part 100 and displaying a predetermined image.

In this configuration example, the fingerprint detection part 100 is provided in a region substantially corresponding to a display region 200*a* of the display panel part 200. In other words, the display panel part 200 is integrally laminated on the fingerprint detection part 100.

In a case where fingerprint detection is performed only in a part of the display region 200*a*, the fingerprint detection part 100 may be provided corresponding to only the part of the display region 200*a*.

The fingerprint detection part 100 includes the photoelectric conversion element 10 according to an embodiment of the present invention as a functional part exhibiting an essential function. The fingerprint detection part 100 can include any preferred publicly known components such as a protection film, a supporting substrate, a sealing substrate, a sealing component, a barrier film, a bandpass filter, and an infrared cut film (not illustrated) in an aspect corresponding to the design where desired characteristics can be obtained. The configuration of the image detection part which has been described can be employed for the fingerprint detection part 100.

The photoelectric conversion element 10 can be included in the display region 200*a* in any aspect. For example, a plurality of photoelectric conversion elements 10 may be arranged in a matrix pattern.

The photoelectric conversion element 10 is provided on the supporting substrate 11 or the sealing substrate as described above. The supporting substrate 11 is provided with an electrode (anode or cathode) in a matrix pattern, for example.

Light received in the photoelectric conversion element 10 is converted into an electric signal corresponding to the received light amount by the photoelectric conversion element 10, and then output outside the photoelectric conversion element 10 via the electrode as a received light signal, that is, an electric signal corresponding to the imaged fingerprint.

In this configuration example, the display panel part 200 is configured as an organic electroluminescence display panel (organic EL display panel) including a touch sensor panel. The display panel part 200 may be composed of a display panel having any preferred publicly known components such as a liquid crystal display panel including a light source such as a back light instead of the organic EL display panel, for example.

The display panel part 200 is provided on the fingerprint detection part 100 which has been described. The display panel part 200 includes an organic electroluminescence element (organic EL element) 220 as a functional part exhibiting an essential function. The display panel part 200 can further include any preferred publicly known components, for example, a substrate (supporting substrate 210 or sealing substrate 240) such as any preferred publicly known glass substrate, a sealing component, a barrier film, a polarizing plate such as a circularly polarizing plate, and a touch sensor panel 230 in an aspect corresponding to desired characteristics.

In the configuration example as described above, the organic EL element 220 is used as a light source of pixels in the display region 200*a*, and is also used as a light source for imaging a fingerprint in the fingerprint detection part 100.

Here, operations of the fingerprint detection part 100 will be simply described.

In execution of fingerprint authentication, the fingerprint detection part 100 detects a fingerprint by using light emitted from the organic EL element 220 in the display panel part 200. Specifically, light emitted from the organic EL element 220 passes through components existing between the organic EL element 220 and the photoelectric conversion element 10 of the fingerprint detection part 100, and is reflected by the skin of the fingertip (surface of the finger) placed on the surface of the display panel part 200 in the display region 200a. At least a part of light reflected by the surface of the finger passes through components exiting between the organic EL element 220 and the photoelectric conversion element 10, is then received by the photoelectric conversion element 10, and converted into an electric signal corresponding to the received light amount of the photoelectric conversion element 10. Then, image information about the fingerprint of the surface of the finger is constituted based on the converted electric signal.

The portable information terminal including the display device 2 executes fingerprint authentication by comparing the obtained image information with fingerprint data for fingerprint authentication which has been recorded in advance by any preferred publicly known step.

EXAMPLES

Hereinafter, examples will be given for further detailed description of the present invention. The present invention is not limited to the following examples.

<Example 1> Production and Evaluation of Photoelectric Conversion Element (Production of Photoelectric Conversion Element)

An ITO thin film (cathode) was formed on a glass substrate to have a thickness of 150 nm by a sputtering method. The surface of the glass substrate was subjected to ozone UV treatment.

Subsequently, a coating liquid for forming an electron transportation layer was prepared by mixing 0.1 g of a 1 wt. % polyethyleneimine ethoxylate (PEIE) aqueous solution (manufactured by Sigma-Aldrich Co. LLC, trade name: polyethyleneimine, 80% ethoxylated solution, weight average molecular weight: 110,000) and 1 g of a solution containing a 10 wt. % zinc oxide/isopropanol dispersion (manufactured by TAYCA Corporation, product name: HTD-711Z) in 10 g of 3-pentanol.

The obtained coating liquid for forming an electron transportation layer was applied on the ITO thin film of the glass substrate which has been subjected to ozone UV treatment by a spin coating method, thus forming a coating film.

The glass substrate on which the coating film has been formed was heat-treated at 120° C. for 10 minutes by using a hot plate to cure the formed coating film. Thus, an electron transportation layer which is a cathode was formed on the ITO thin film. The thickness of the obtained electron transportation layer was 50 nm.

A polymer compound P-1 represented by the following formula, which is a p-type semiconductor material, and C60PCBM (manufactured by Frontier Carbon Corporation, trade name: E100), which is an n-type semiconductor material, were mixed at a weight ratio (p/n ratio) of 1/1.75.

The obtained mixture was added to a mixed solvent of o-xylene and acetophenone (o-xylene/acetophenone=95/5 (weight ratio)) so that the content of the p-type semiconductor material was 2 wt. % relative to the amount of the mixed solvent, and dissolved with stirring at 60° C. for 10 hours. Thus, a coating liquid for forming an active layer was prepared.

[Chemical Formula 29]

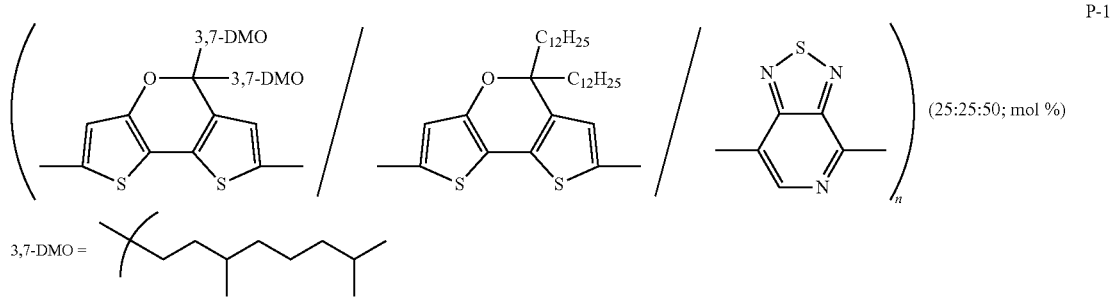

P-1

The obtained coating liquid for forming an active layer was applied on the electron transportation layer formed on the glass substrate by a spin coating method, thus forming a coating film. The obtained coating film was heated for 10 minutes using a hot plate heated to 100° C. to perform dry treatment, thus forming an active layer. The thickness of the obtained active layer was 550 nm.

Molybdenum oxide ($MoO_3$) was deposited on the obtained active layer to have a thickness of approximately 30 nm by using a resistance heating vapor deposition apparatus, forming a hole transportation layer.

A silver (Ag) layer was deposited on the obtained hole transportation layer to have a thickness of approximately 80 nm, thus forming an anode. Thereby, a photoelectric conversion element (photodetection element) was produced.

A UV curing agent was applied on a sealing substrate (glass substrate). The obtained photoelectric conversion element was bonded to the sealing substrate in a manner that the UV curing agent encloses the photoelectric conversion element. Then, the photoelectric conversion element was sealed by irradiation with UV light.

The shape of the obtained photoelectric conversion element viewed in the thickness direction on the plane was a square of 2 mm×2 mm.

(Evaluation of Photoelectric Conversion Element)

Measurement and calculation for the produced photoelectric conversion element and related parameters were performed as follows. The results are shown in Table 2.

(1) Evaluation of Dark Current Ratio

The dark current ratio of the produced photoelectric conversion element was evaluated. Here, the dark current ratio refers to the ratio of the dark current obtained when a voltage of 10 V is applied and the dark current obtained when a voltage of 2 V is applied (dark current (10 V)/dark current (2 V)).

In the measurement of the dark current, the dark current was measured when a reverse bias voltage of each of 10 V and 2 V was applied by using a semiconductor parameter analyzer (B1500A, manufactured by Agilent Technologies). The dark current ratio was calculated based on the values of the obtained dark current.

(2) Measurement of Energy Level of LUMO of n-Type Semiconductor Material

The energy level of the LUMO of C60PCBM which is an n-type semiconductor material contained in the active layer was estimated by cyclic voltammetry (CV).

The CV measurement was performed under the same conditions as in the method described in Advanced Materials, vol. 18, 2006, pp. 789 to 794. The used instrument and the like are as follows.

CV measurement apparatus: manufactured by BAS Inc., Electrochemical Analyzer Model 600B Supporting electrolyte: a dehydrated acetonitrile solution containing tetrabutylammonium hexafluorophosphate ($TBAPF_E$, manufactured by Sigma-Aldrich Co. LLC) at a concentration of 0.1 M Working electrode: platinum foil/n-type semiconductor material (a solution in which the n-type semiconductor material is dissolved in chloroform is dropped)

Counter electrode: platinum foil

Reference electrode: Ag/AgCl electrode

Standard electrode potential: ferrocene

As a result, the energy level of the LUMO of C60PCBM was −4.3 eV.

(3) Measurement of Work Function (WF) of Electron Transportation Layer

The work function of the electron transportation layer was determined by measuring, by using a Kelvin probe apparatus, an electron transportation layer obtained by applying a coating liquid for forming an electron transportation layer to a glass substrate, followed by heat-treatment at 120° C. for 10 minutes using a hot plate. For the Kelvin probe apparatus, FAC-2, manufactured by Riken Keiki Co., Ltd. was used. Gold (WF: 5.1 eV) was used as a standard sample for calibration. The work function of the electron transportation layer was 3.77 eV.

(4) Measurement of Work Function (WF) of Cathode

The work function of the cathode was determined by measuring an ITO thin film (cathode) obtained by forming an ITO thin film on a glass substrate to have a thickness of 150 nm, by using a Kelvin probe apparatus. For the Kelvin probe apparatus, FAC-2, manufactured by Riken Keiki Co., Ltd. was used. Gold (WF: 5.1 eV) was used as a standard sample for calibration. The work function of the cathode was 4.80 eV.

(5) Calculation of ΔWF and ΔE

The ΔWF and ΔE were respectively calculated based on the energy level of the LUMO of the obtained C60PCBM (n-type semiconductor material contained in the active layer) (LUMO), the work function of the electron transportation layer (Wf1), and the work function of the cathode (Wf2) by the following formulas.

$$\Delta WF = Wf2 - Wf1$$

$$\Delta E = |LUMO| - Wf1$$

Example 2

A photoelectric conversion element was produced in the same manner as in Example 1 except for using 2-propanol instead of 3-pentanol used as a solvent in the coating liquid for forming an electron transportation layer, and evaluated.

Example 3

A photoelectric conversion element was produced in the same manner as in Example 1 except for using ethanol instead of 3-pentanol used as a solvent in the coating liquid for forming an electron transportation layer, and evaluated.

Comparative Example 1

(Production of Photoelectric Conversion Element)

An ITO thin film (cathode) was formed on a glass substrate to have a thickness of 150 nm by a sputtering method. The surface of the glass substrate was subjected to ozone UV treatment.

A photoelectric conversion element was produced in the same manner as in Example 1 except for using a coating liquid for forming an electron transportation layer prepared by mixing 0.1 g of a 1 wt. % polyethyleneimine ethoxylate (PEIE) aqueous solution (manufactured by Sigma-Aldrich Co. LLC, trade name: polyethyleneimine, 80% ethoxylated solution, weight average molecular weight: 110,000) in 10 g of water, and evaluated.

Comparative Example 2

A photoelectric conversion element was produced in the same manner as in Example 1 except for using a coating liquid for forming an electron transportation layer prepared by diluting a 10 wt. % zinc oxide/isopropanol dispersion (manufactured by TAYCA Corporation, product name: HTD-711Z) 10 times with 3-pentanol, and evaluated.

Comparative Example 3

A solution as a coating liquid for forming a first electron transportation layer, prepared by diluting a 10 wt. % zinc oxide/isopropanol dispersion (manufactured by TAYCA Corporation, product name: HTD-711Z) 10 times with 3-pentanol was applied on an ITO thin film of a glass substrate which has been subjected to ozone NV treatment by a spin coating method.

The glass substrate on which the coating liquid for forming a first electron transportation layer has been applied was heat-treated at 120° C. for 10 minutes by using a hot plate to cure the coating film. Thus, a first electron transportation layer which is a cathode was formed on the ITO thin film.

Then, a solution as a coating liquid for forming a second electron transportation layer prepared by diluting a 1 wt. % polyethyleneimine ethoxylate (PEIE) aqueous solution (manufactured by Sigma-Aldrich Co. LLC, trade name: polyethyleneimine, 80% ethoxylated solution, weight average molecular weight: 110,000) 100 times with 2-methoxyethanol was applied on the first electron transportation layer by a spin coating method. A second electron transportation layer was formed on the first electron transportation layer by heat treatment at 120° C. for 10 minutes using a hot plate. As described above, the electron transportation layer of Comparative Example 3 has a two-layer structure in which the first electron transportation layer and the second electron transportation layer are laminated.

Hereinafter, photoelectric conversion elements were produced in the same manner as in Example 1, and evaluated.

Comparative Example 4

A photoelectric conversion element was produced in the same manner as in Example 1 except for using methanol instead of 3-pentanol used as a solvent in the coating liquid for forming an electron transportation layer, and evaluated.

TABLE 2

| | Electron transportation layer | Solvent of coating liquid for forming electron transportation layer | Wf1 (eV) | ΔWf | ΔE | Dark current ratio |
|---|---|---|---|---|---|---|
| Example 1 | ZnO and PEIE | 3-Pentanol | 3.77 | 1.03 | 0.38 | 4.05 |
| Example 2 | ZnO and PEIE | 2-Propanol | 3.84 | 0.96 | 0.31 | 4.07 |
| Example 3 | ZnO and PEIE | Ethanol | 3.89 | 0.91 | 0.26 | 4.52 |
| Comparative Example 1 | PETE | Water | 4.12 | 0.68 | 0.03 | 5.64 |
| Comparative Example 2 | ZnO | 3-Pentanol | 4.22 | 0.58 | −0.07 | 5.60 |
| Comparative Example 3 | ZnO/PEIE (Two-layer structure) | 3-Pentanol/2-methoxyethanol | 3.92 | 0.88 | 0.23 | 4.80 |
| Comparative Example 4 | ZnO and PEIE | Methanol | 4.15 | 0.65 | 0.00 | 5.53 |

As is clear from the above Examples and Comparative Examples, in the photoelectric conversion elements of Examples 1 to 3, in which an electron transportation layer with a single layer structure containing ZnO serving as a semiconductor material and PEIE serving as an insulating material was formed by using a predetermined solvent, the work function of the electron transportation layer was significantly increased compared to those of Comparative Examples 1 to 4 which did not such requirements. In particular, even in Comparative Example 3 which has a conventional two-layer structure of ZnO/PEIE and a single layer structure containing ZnO and PEIE, the work function could be increased compared to that of Comparative Example 4 which used methanol as a solvent.

Such increase in the work function of the electron transportation layer allows increase in the difference ΔWf between the work function of the electron transportation layer and the work function of the cathode, and also allows the work function of the electron transportation layer to be larger than the energy level of the LUMO of the n-type semiconductor material contained in the active layer. Thus, it was confirmed that the difference LE between the work function of the electron transportation layer and the energy level of the LUMO of the n-type semiconductor material was further increased. As a result, it was confirmed that the dark current ratio was further reduced.

As described above, in the photoelectric conversion element of the present invention, variation of the dark current is small even when a voltage applied to the photoelectric conversion element is varied. Thus, the photoelectric conversion element of the present invention can be flexibly applied to various applications where a desired operation voltage varies without any special design change and the like.

DESCRIPTION OF REFERENCE SIGNS

1 Image detection part
2 Display device
10 Photoelectric conversion element
11, 210 Supporting substrate
12 Cathode
13 Electron transportation layer
14 Active layer
15 Hole transportation layer
16 Anode
17, 240 Sealing substrate
20 CMOS transistor substrate
30 Interlayer insulating film
32 Interlayer wiring part
40 Sealing layer
50 Color filter
100 Fingerprint detection part
200 Display panel part
200a Display region
220 Organic EL element
230 Touch sensor panel

The invention claimed is:

1. A photoelectric conversion element comprising an anode, a cathode, an active layer provided between the anode and the cathode, and at least one electron transportation layer provided between the active layer and the cathode, wherein one layer of the at least one electron transportation layer contains an insulating material and a semiconductor material; and a work function of the one layer (Wf1) and a work function of the cathode (Wf2) satisfy the following Formula (1):

$$Wf2-Wf1 \geq 0.88 \text{ eV} \quad (1);$$

the active layer contains a p-type semiconductor material and an n-type semiconductor material; and the work function of the electron transportation layer (Wf1) and an energy level of a lowest occupied molecular orbital of the n-type semiconductor material (LUMO) satisfy the following Formula (2):

$$|LUMO|-Wf1 \geq 0.06 \text{ eV} \quad (2).$$

2. The photoelectric conversion element according to claim 1, wherein the electron transportation layer is a layer cured by subjecting a coating film containing the insulating material, the semiconductor material, and a solvent having a boiling point of 68° C. or more to dry treatment.

3. The photoelectric conversion element according to claim 2, wherein the solvent includes an alcohol solvent having a pKa of 15.5 or more.

4. The photoelectric conversion element according to claim 3, wherein the alcohol solvent includes one or more alcohol solvent selected from the group consisting of ethanol, 2-propanol, and 3-pentanol.

5. A method for producing the photoelectric conversion element according to claim 1, the method comprising a step of applying a coating liquid containing the insulating material, the semiconductor material, and a solvent having a boiling point of 68° C. or more to form a coating film and subjecting the coating film to dry treatment to cure the coating film, thus forming the electron transportation layer.

6. The method for producing a photoelectric conversion element according to claim 5, wherein the insulating material is a polymer having an amino group or an alkoxy group.

7. The method for producing a photoelectric conversion element according to claim 6, wherein the insulating material is ethoxylated polyethyleneimine.

8. The method for producing a photoelectric conversion element according to claim 5, wherein the solvent includes an alcohol solvent having a pKa of or more.

9. The method for producing a photoelectric conversion element according to claim 8, wherein the alcohol solvent include one or more alcohol solvent selected from the group consisting of ethanol, 2-propanol, and 3-pentanol.

10. The method for producing a photoelectric conversion element according to claim 5, wherein the semiconductor material is one or more oxide semiconductor material selected from the group consisting of ZnO, AZO, and GZO.

11. The photoelectric conversion element according to claim 1, wherein the n-type semiconductor material is a fullerene derivative.

12. The photoelectric conversion element according to claim 11, wherein the fullerene derivative is C60PCBM.

13. The photoelectric conversion element according to claim 1, wherein the insulating material is a polymer having an amino group or an alkoxy group.

14. The photoelectric conversion element according to claim 13, wherein the insulating material is ethoxylated polyethyleneimine.

15. The photoelectric conversion element according to claim 1, wherein the photoelectric conversion element is a photodetection element.

16. An image sensor comprising the photoelectric conversion element according to claim 15.

17. A fingerprint authentication device comprising the photoelectric conversion element according to claim 15.

18. The photoelectric conversion element according to claim 1, wherein
a work function of the insulating material (Wf3), the work function of the electron transportation layer (Wf1), and a work function of the semiconductor material (Wf4) satisfy the following Formulae (3) and (4):

$$Wf3 > Wf1 \tag{3}$$

$$Wf3 < Wf4 \tag{4}.$$

19. The photoelectric conversion element according to claim 1, wherein the semiconductor material is one or more oxide semiconductor material selected from the group consisting of ZnO, AZO, and GZO.

* * * * *